US010704686B2

(12) United States Patent
Hattori et al.

(10) Patent No.: US 10,704,686 B2
(45) Date of Patent: Jul. 7, 2020

(54) CONTROL APPARATUS FOR VEHICLE DRIVE-FORCE TRANSMITTING APPARATUS

(71) Applicant: TOYOTA JIDOSHA KABUSHIKI KAISHA, Toyota-shi, Aichi (JP)

(72) Inventors: Kunio Hattori, Nagoya (JP); Koji Hattori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 35 days.

(21) Appl. No.: 16/232,562

(22) Filed: Dec. 26, 2018

(65) Prior Publication Data
US 2019/0195358 A1    Jun. 27, 2019

(30) Foreign Application Priority Data

Dec. 27, 2017    (JP) ................................. 2017-252414

(51) Int. Cl.
| | |
|---|---|
| *F16H 61/662* | (2006.01) |
| *F16H 37/08* | (2006.01) |
| *F16H 9/18* | (2006.01) |

(52) U.S. Cl.
CPC ......... *F16H 61/66272* (2013.01); *F16H 9/18* (2013.01); *F16H 37/0846* (2013.01); *F16H 2037/0866* (2013.01)

(58) Field of Classification Search
CPC .......... F16H 61/66272; F16H 37/0846; F16H 2037/0866; F16H 9/18; F16H 61/662
See application file for complete search history.

(56) References Cited

U.S. PATENT DOCUMENTS

| | | | | |
|---|---|---|---|---|
| 2002/0025881 A1* | 2/2002 | Miyazaki | .......... | F16H 61/66272 477/44 |
| 2006/0069486 A1* | 3/2006 | Yamaguchi | ....... | F16H 61/66259 701/51 |
| 2006/0276279 A1* | 12/2006 | Suzuki | .................... | F16H 61/12 474/8 |
| 2013/0218429 A1* | 8/2013 | Ayabe | .................. | F16H 61/662 701/61 |

FOREIGN PATENT DOCUMENTS

JP     2010-107006 A    5/2010

\* cited by examiner

*Primary Examiner* — Huan Le
(74) *Attorney, Agent, or Firm* — Oliff PLC

(57) ABSTRACT

A control apparatus for a drive-force transmitting apparatus that includes a transmission having primary and secondary pulleys. The control apparatus calculates a target thrust applied to the secondary pulley such that the target thrust is larger during a vehicle driven state than during a vehicle driving state. The control apparatus sets a first determination threshold of a drive-force related value used to determine whether it is the vehicle driving state or vehicle driven state and a second determination threshold of the drive-force related value used to switch from determination of the driven state to determination of the driving state, such that a difference of the first and second determination thresholds is larger and a range of the drive-force related value in which the driven state is determined is wider, when an automatic running-speed control is executed, than when the automatic running-speed control is not executed.

8 Claims, 8 Drawing Sheets

CONTROL APPARATUS FOR VEHICLE DRIVE-FORCE TRANSMITTING APPARATUS

This application claims priority from Japanese Patent Application No. 2017-252414 filed on Dec. 27, 2017, the disclosure of which is herein incorporated by reference in its entirety.

FIELD OF THE INVENTION

The present invention relates to a control apparatus for a drive-force transmitting apparatus that is to be provided in a vehicle, wherein the drive-force transmitting apparatus includes a continuously-variable transmission mechanism provided in a drive-force transmitting path between a drive force source and drive wheels of the vehicle.

BACKGROUND OF THE INVENTION

There is known a control apparatus for a vehicle drive-force transmitting apparatus including a primary pulley, a secondary pulley and a transfer element that is looped over the primary and secondary pulleys, so as to transmit a drive force of a drive force source toward drive wheels. JP-2010-107006A discloses such a vehicle control apparatus, teaching that (i) it is determined whether the vehicle is in a driving state or a driven state, based on an acceleration of the vehicle and an accelerator operation amount, and that (ii) a thrust ratio, which is a ratio of a secondary thrust (applied to the secondary pulley) to a primary thrust (applied to the primary pulley), is made higher when the vehicle is in the driven state than when the vehicle is in the driving state, namely, the secondary thrust calculated based on the primary thrust is made larger when the vehicle is in the driven state than when the vehicle is in the driving state.

SUMMARY OF THE INVENTION

By the way, there is also known a vehicle in which an automatic running-speed control (e.g., cruise control) is executed to automatically control a running speed of the vehicle by changing a manipulated variable such as an output torque of the drive force source of the vehicle such that an actual running speed coincides with a target running speed. In such an automatic running-speed control in which the output torque of the drive force source is changed in a manner that makes the actual running speed coincide with the target running speed, the output torque of the drive force source is easily fluctuated in the vicinity of a boundary between the driving state and the driven state. Where a target value of the secondary thrust is set to a value that varies depending on whether the vehicle is in the driven state or the driving state, the secondary thrust is easily fluctuated upon switching between the driven state and the driving state. The fluctuation of the secondary thrust causes fluctuation of a load of an oil pump, which is driven by the drive force source to discharge a working fluid pressure as its original pressure that is to be supplied to the secondary pulley, for example, so that the output torque of the drive force source driving the oil pump is fluctuated whereby an input torque inputted to the continuously-variable transmission mechanism is also fluctuated. Further, due to the fluctuation of the input torque, an efficiency of transmission of the drive force could be changed in the continuously-variable transmission mechanism. Consequently, it becomes difficult to establish a drive torque as desired, by accurately recognizing a situation, so that controllability of the running speed could be reduced. For example, in contrast with a situation in which the actual running speed is converged to the target running speed, the actual running speed could be fluctuated across the target running speed with a larger amplitude, and could be difficult to be converged to the target running speed.

The present invention was made in view of the background art described above. It is therefore an object of the present invention to provide a control apparatus for a vehicle drive-force transmitting apparatus, which is capable of improving controllability of a running speed of the vehicle while restraining or preventing slippage of a transfer element during execution of an automatic running-speed control.

The object indicated above is achieved according to the following aspects of the present invention.

According to a first aspect of the invention, there is provided a control apparatus for a drive-force transmitting apparatus that is to be provided in a vehicle having a drive force source and drive wheels. The drive-force transmitting apparatus includes: a continuously-variable transmission mechanism which is configured to transmit a drive force of the drive force source toward the drive wheels, and which includes a primary pulley, a secondary pulley and a transfer element that is looped over the primary and secondary pulleys, such that the primary pulley includes a primary hydraulic actuator configured to generate a primary thrust, based on which the transfer element is to be clamped by the primary pulley, and such that the secondary pulley includes a secondary hydraulic actuator configured to generate a secondary thrust, based on which the transfer element is to be clamped by the secondary pulley. The control apparatus includes: an automatic running-speed control portion configured to execute an automatic running-speed control to change a drive-force related value that is used to control a running speed of the vehicle such that an actual value of the running speed coincides with a target value of the running speed; a state determining portion configured to make a determination as to whether the vehicle is in a driving state or a driven state, based on the drive-force related value; a target-thrust calculating portion configured to calculate a target value of the secondary thrust based on the primary thrust, such that the calculated target value of the secondary thrust is larger when the vehicle is in the driven state than when the vehicle is in the driving state; and a threshold setting portion configured to set a first determination threshold of the drive-force related value which is used to determine whether the vehicle is in the driving state or in the driven state and a second determination threshold of the drive-force related value which is used to switch from a determination that the vehicle is in the driven state to a determination that the vehicle is in the driving state, such that a difference of the set first determination threshold and the set second determination threshold is larger when the automatic running-speed control is being executed than when the automatic running-speed control is not being executed, and a range of the drive-force related value in which it is determined that the vehicle is in the driven state is wider when the automatic running-speed control is being executed than when the automatic running-speed control is not being executed. For example, the state determining portion may be configured to make the determination as to whether the vehicle is in the driving state or in the driven state, in a repeated manner during running of the vehicle, such that the state determining portion determines that the vehicle is in the driven state when the drive-force related value is smaller than the first determination threshold, and determines that the vehicle is in the driving state when the drive-force related value is not smaller than the second determination threshold that is larger than the first determination threshold, and such that the state determining portion maintains the determination previously made by the state determining portion when the drive-force related value is not smaller than the first determination threshold and smaller than the second determination threshold. The threshold setting portion may be configured to set the first and second determination thresholds, such that the above-described difference is larger when the automatic running-speed control is being executed than when the automatic running-speed control is not being executed, by at least making the second determination threshold larger when the automatic running-speed control is being executed than when the automatic running-speed control is not being executed.

According to a second aspect of the invention, in the control apparatus according to the first aspect of the invention, the drive-force related value is one of an output torque outputted from the drive force source, an input torque inputted to the continuously-variable transmission mechanism and a torque applied to the drive wheels.

According to a third aspect of the invention, in the control apparatus according to the first or second aspect of the invention, the target-thrust calculating portion is configured to calculate, based on an input torque inputted to the continuously-variable transmission mechanism, a thrust ratio which is a ratio of the secondary thrust of the secondary pulley to the primary thrust of the primary pulley and which establishes a target gear ratio of the continuously-variable transmission mechanism, wherein the target-thrust calculating portion is configured to calculate the target value of the secondary thrust, based on the calculated thrust ratio and the primary thrust, and wherein the thrust ratio is calculated based on the input torque by the target-thrust calculating portion such that a predetermined condition is satisfied, wherein the predetermined condition is that a value of the thrust ratio during the driven state of the vehicle makes a difference between the primary thrust and the target value of the secondary thrust larger, than a value of the thrust ratio during the driving state of the vehicle.

According to a fourth aspect of the invention, in the control apparatus according to any one of the first through third aspects of the invention, the primary thrust, base on which the target value of the secondary thrust is calculated, is a primary-side slip limit thrust that is required to prevent slippage of the transfer element on the primary pulley.

According to a fifth aspect of the invention, in the control apparatus according to the fourth aspect of the invention, the target-thrust calculating portion is configured to select, as the target value of the secondary thrust, a larger one of the secondary thrust calculated based on the primary-side slip limit thrust and a secondary-side slip limit thrust that is required to prevent slippage of the transfer element on the secondary pulley.

According to a sixth aspect of the invention, in the control apparatus according to the fifth aspect of the invention, the target-thrust calculating portion is configured to calculate, based on the target value of the secondary thrust, a target value of the primary thrust.

According to a seventh aspect of the invention, in the control apparatus according to any one of the first through sixth aspects of the invention, the drive-force transmitting apparatus further includes: an input rotary member to Which the drive force is to be transmitted from the drive force source; an output rotary member from which the drive force is to be outputted to the drive wheels; and a gear mechanism configured to provide at least one gear ratio, wherein the drive-force transmitting apparatus defines a plurality of drive-force transmitting paths that are provided in parallel with each other between the input rotary member and the output rotary member, wherein the plurality of drive-force transmitting paths include a first drive-force transmitting path through which the drive force is to be transmitted by the gear mechanism from the input rotary member toward the output rotary member when the first drive-force transmitting path is established, and wherein the plurality of drive-force transmitting paths includes a second drive-force transmitting path through which the drive force is to be transmitted by the continuously-variable transmission mechanism from the input rotary member toward the output rotary member when the second drive-force transmitting path is established.

In the control apparatus according to the first aspect of the invention, the difference between the first determination threshold (that is used to determine whether the vehicle is in the driving state or the driven state) and the second determination threshold (that is used to switch from the determination that the vehicle is in the driven state to the determination that the vehicle is in the driving state) is made larger when the automatic running-speed control is being executed than when the automatic running-speed control is not being executed, such that the range of the drive-force related value in which it is determined that the vehicle is in the driven state is wider when the automatic running-speed control is being executed than when the automatic running-speed control is not being executed. Thus, when the automatic running-speed control is being executed, fluctuation of the secondary thrust due to switching between the determination of the driven state and the determination of the driving state is less likely to be caused when the automatic running-speed control is being executed, whereby controllability of the vehicle running speed is improved during execution of the automatic running-speed control. Further, since the difference between the first determination threshold and the second determination threshold is made larger when the automatic running-speed control is being executed such that the above-described range of the drive-force related value (in which it is determined that the vehicle is in the driven state) is wider, it is more likely to be determined that the vehicle is in the driven state in which the target value of the secondary thrust is made larger than in the driving state, so that slippage of the transfer element due to insufficiency of the secondary thrust is less likely to be caused. Thus, during execution of the automatic running-speed control, it is possible to improve controllability of the running speed of the vehicle while restraining or preventing the slippage of the transfer element.

In the control apparatus according to the second aspect of the invention, the drive-force related value is the output torque of the drive force source, the input torque of the continuously-variable transmission mechanism or the torque applied to the drive wheels, so that the automatic running-speed control is appropriately executed.

In the control apparatus according to the third aspect of the invention, the thrust ratio, which establishes the target gear ratio of the continuously-variable transmission mechanism, is calculated based on the input torque inputted to the continuously-variable transmission mechanism, and the calculated thrust ratio is used to calculate the target value of the secondary thrust based on the primary thrust. Thus, it is possible to appropriately obtain the secondary thrust which establishes the target gear ratio of the continuously-variable transmission mechanism and which is dependent on the input torque inputted to the continuously-variable transmission mechanism. Further, the thrust ratio is calculated based on the input torque such that the predetermined condition is satisfied, wherein the predetermined condition is that a value of the thrust ratio during the driven state of the vehicle makes the difference between the primary thrust and the target value of the secondary thrust larger, than a value of the thrust ratio during the driving state of the vehicle does. Therefore, the target value of the second thrust is larger when the vehicle is in the driven state than when the vehicle is in the driving state.

In the control apparatus according to the fourth aspect of the invention, the primary thrust, based on which the target value of the secondary thrust is calculated, is the primary-side slip limit thrust that is required to prevent slippage of the transfer element on the primary pulley. Thus, it is possible to appropriately obtain the secondary thrust that restrains or prevents slippage of the transfer element.

In the control apparatus according to the fifth aspect of the invention, a larger one of the secondary thrust calculated based on the primary-side slip limit thrust and a secondary-side slip limit thrust that is required to prevent slippage of the transfer element on the secondary pulley, is selected as the target value of the secondary thrust, so that it is possible to appropriately obtain the secondary thrust that establishes the target gear ratio of the continuously-variable transmission mechanism while restraining or preventing slippage of the transfer element.

In the control apparatus according to the sixth aspect of the invention, the target value of the primary thrust is calculated based on the target value of the secondary thrust. Thus, it is possible to appropriately obtain the secondary thrust that establishes the target gear ratio of the continuously-variable transmission mechanism while restraining or preventing slippage of the transfer element. Further, each of the secondary thrust and the primary thrust is not set to a value excessively large to prevent slippage of the transfer element.

In the control apparatus according to the seventh aspect of the invention, in the drive-force transmitting apparatus defining the plurality of drive-force transmitting paths which are provided in parallel with each other between the input and output rotary members and which, include the first drive-force transmitting path provided with the gear mechanism and the second-drive transmitting path provided with the continuously-variable transmission mechanism, it is possible to improve controllability of the running speed while restraining or preventing slippage of the transfer element during execution of the automatic miming-speed control.

DETAILED DESCRIPTION OF PREFERRED EMBODIMENT

Figure 1:
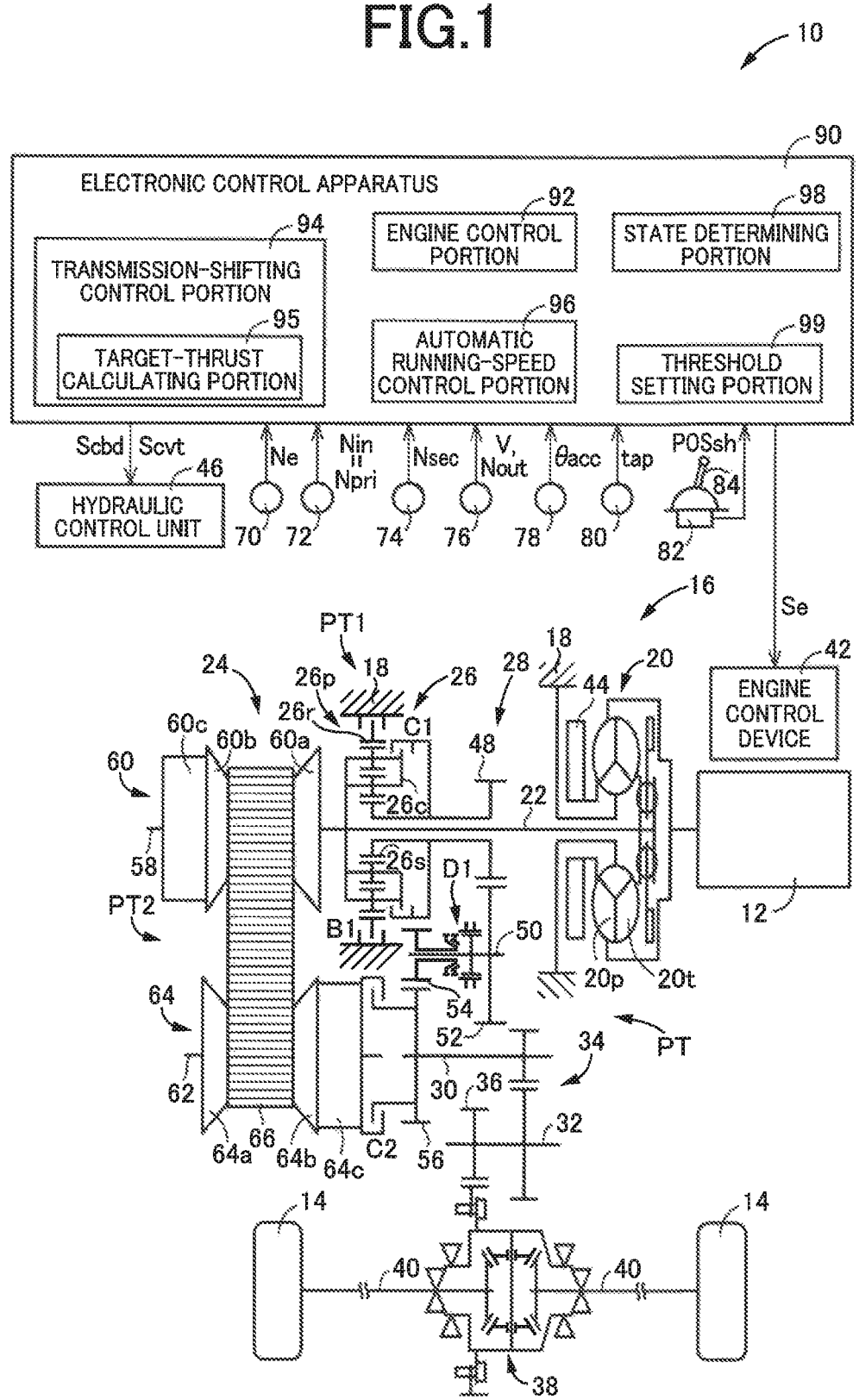
FIG. 1 is a schematic view showing a construction of a vehicle to be controlled by a control apparatus according to the present invention, and major control functions and control portions of the control apparatus.

In the embodiment of the present invention, each of the primary pulley (i.e., input-side pulley) and the secondary pulley (i.e., output-side pulley) includes, for example, a fixed sheave, a movable sheave and a hydraulic actuator, which is configured to apply a thrust for changing a width of an annular groove defined between the fixed and movable sheaves of a corresponding one of the primary and secondary pulleys. A vehicle provided with the above-described drive-force transmitting apparatus includes a hydraulic control unit configured to control pulley hydraulic pressures supplied as working hydraulic pressures to the respective hydraulic actuators, independently of each other. The hydraulic control unit may be configured to control an amount of flow of a working fluid supplied to each of the hydraulic actuators so as to consequently generate the pulley hydraulic pressures, for example. A shifting control operation is performed by the hydraulic control unit to execute a shifting action to establish a target gear ratio while preventing slippage of a transfer element in the continuously-variable transmission mechanism, by controlling the thrust (=pulley hydraulic pressure*pressure receiving area) applied to each of the primary and secondary pulleys. The transfer element, which is looped over the primary and secondary pulleys, may be a compression-type endless annular transmission belt including at least one endless annular hoop and a multiplicity of thick-plate-shaped block elements that are held by the at least one endless annular hoop so as to be arranged in their thickness direction corresponding to a circumferential direction of the transmission belt, along the at least one endless annular hoop, or alternatively, a tension-type belt constituting an endless annular link chain including a plurality of link plates alternately superposed and mutually connected at their end portions through connecting pins. The above-described continuously variable transmission mechanism is a known belt-type continuously-variable transmission, and can be broadly interpreted to conceptually encompass not only the belt-type continuously-variable transmission but also a chain-type continuously-variable transmission.

Further, the above-described target-thrust calculating portion is configured to calculate the above-described slip limit thrust based on the gear ratio of the above-described continuously-variable transmission mechanism and a torque corresponding to the input torque inputted to the continuously-variable transmission mechanism, whereby the target value of the primary thrust for preventing slippage of the transfer element on the primary pulley is appropriately calculated. Further, the target value of the secondary thrust for preventing slippage of the transfer element on the secondary pulley is appropriately calculated. It is noted that the term "gear ratio" is defined as "rotational speed of input-side rotary member/rotational speed of output-side rotary member". For example, the gear ratio of the above-described continuously-variable transmission is defined as "rotational speed of the primary pulley/rotational speed of the secondary pulley". Further, the gear ratio of the above-described drive-force transmitting apparatus defining the plurality of drive-force transmitting paths is defined as "rotational speed of the input rotary member/rotational speed of the output rotary member". A vehicle running speed could be lower as the gear ratio is higher, and could be higher as the gear ratio is lower. For example, a highest gear ratio of the continuously-variable transmission mechanism can be expressed also as a lowest-speed gear ratio.

The above-described first drive-three transmitting path is established by engagement of a first engagement device provided in the first drive-force transmitting path. Further, the above-described second drive-force transmitting path is established by engagement of a second engagement device provided in the second drive-force transmitting path.

The above-described drive force source is, for example, an internal combustion engine such as a gasoline engine and a diesel engine generating a drive force by combustion of fuel supplied thereto. The vehicle may be equipped with, in addition to or in place of a drive force source in the form of the engine, another drive force source in the form of, for example, an electric motor.

Hereinafter, a preferred embodiment of the invention will be described in detail with reference to the accompanying drawings.

Embodiment

FIG. 1 is a schematic view showing a construction of a vehicle 10 to be controlled by a control apparatus according to the present invention, and major control functions and control portions of the control apparatus. As shown in FIG. 1, the vehicle 10 is provided with an engine 12 functioning as a drive force source configured to generate a drive force, drive wheels 14 and a drive-force transmitting apparatus 16 that is provided in drive-force transmitting paths between the engine 12 and the drive wheels 14.

The drive-force transmitting apparatus 16 includes a non-rotary member in the form of a casing 18, a fluid-operated type drive-force transmitting device in the form of a known torque converter 20 that is connected to the engine 12, an input shaft 22 connected to the torque converter 20, a continuously-variable transmission mechanism 24 connected to the input shaft 22, a forward/reverse switching device 26 connected to the input shaft 22, a gear mechanism 28 which is provided in parallel with the continuously-variable transmission mechanism 24 and which is connected to the input shaft 22 via the forward/reverse switching device 26, an output shaft 30 serving as an output rotary member that is common to the continuously-variable transmission mechanism 24 and the gear mechanism 28, a counter shaft 32, a reduction gear device 34 consisting of a pair of mutually meshing gears each of which is connected to a corresponding one of the output shaft 30 and the counter shaft 32 so as to unrotatable relative to the corresponding one of the shafts 30, 32, a gear 36 connected to the counter shaft 32 so as to be unrotatable relative to the counter shaft 32, and a differential gear device 38 connected to the gear 36. The torque converter 20, input shaft 22, continuously-variable transmission mechanism 24, forward/reverse switching device 26, gear mechanism 28, output shaft 30, counter shaft 32, reduction gear device 34, gear 36 and differential gear device 38 are disposed within the casing 18. The drive-force transmitting apparatus 16 further includes right and left axles 40 that are connected to the differential gear device 38. The input shaft 22 serves as an input rotary member to which the drive force of the engine 12 is to be inputted. The output shaft 30 serves as the output rotary member through which the drive force of the engine 12 is to be outputted. It is noted that the above-described drive force is synonymous with a drive torque or a drive power unless otherwise distinguished from them.

In the drive-force transmitting apparatus 16 constructed as described above, the drive force generated by the engine 12 is transmitted to the right and left drive wheels 14, via the torque converter 20, forward/reverse switching device 26, gear mechanism 28, reduction gear device 34, differential gear device 38, axles 40 and other elements, or alternatively, via the torque converter 20, continuously-variable transmission mechanism 24, reduction gear device 34, differential gear device 38, axles 40 and other elements.

As described above, the drive-force transmitting apparatus 16 has the gear mechanism 28 and the continuously-variable transmission mechanism 24 that are provided in parallel with each other in respective drive-force transmitting paths PT between the engine 12 and the drive wheels 14. Specifically, the drive-force transmitting apparatus 16 has the gear mechanism 28 and the continuously-variable transmission mechanism 24 that are provided in parallel with each other in the respective drive-force transmitting paths PT between the input shaft 22 and the output shaft 30. That is, the drive-force transmitting apparatus 16 defines the plurality of drive-force transmitting paths that are parallel with each other between the input shaft 22 and the output shaft 30, such that the drive force of the engine 12 is to be transmitted from the input shaft 22 to the output shaft 30 through a selected one of the drive-force transmitting paths PT. The plurality of drive-force transmitting paths PT consist of a first drive-force transmitting path PT1 constituted mainly by the gear mechanism 28 and a second drive-force transmitting path PT2 constituted mainly by the continuously-variable transmission mechanism 24. The first and second drive-force transmitting paths PT1, PT2 are defined in parallel with each other between the input shaft 22 and the output shaft 30. The first drive-force transmitting path. PT1 is a path through which the drive force of the engine 12 is to be transmitted from the input shaft 22 toward the drive wheels 14 through the gear mechanism 28. The second drive-force transmitting path PT2 is a path through which the drive force of the engine 12 is to be transmitted from the input shaft 22 toward the drive wheels 14 through the continuously-variable transmission mechanism 24.

In the drive-force transmitting apparatus 16, the drive force of the engine 12 is transmitted toward the drive wheels 14 through a selected one of the first and second drive-force transmitting paths PT1, PT2, which is selected depending on a running state of the vehicle 10. To this end, the drive-force transmitting apparatus 16 includes a plurality of engagement devices by which the selected one of the first and second drive-force transmitting paths PT1, PT2 is established. The plurality of engagement devices include a first clutch C1, a first brake B1 and a second clutch C2. The first clutch C1, which serves as a first engagement device, is provided in the first drive-force transmitting path PT1 and configured to selectively connect and disconnect the first drive-force transmitting path PT1, such that the first drive-force transmitting path PT1 is established with engagement of the first clutch C1 during forward running of the vehicle 10. The first brake B1, which serves as an engagement device, is provided in the first drive-force transmitting path PT1 and configured to selectively connect and disconnect the first drive-force transmitting path PT1, such that the first drive-force transmitting path PT1 is established with engagement of the first brake B1 during reverse running of the vehicle 10. That is, the first drive-force transmitting path PT1 is established with either the first clutch C1 or the first brake B1 being engaged. The second clutch C2, which serves as a second engagement device, is disposed in the second drive-force transmitting path PT2 and configured to selectively connect and disconnect the second drive-force transmitting path PT2, such that the second drive-force transmitting path PT2 is established with engagement of the second clutch C2. That is, the second drive-force transmitting path PT2 is established with the second clutch C2 being engaged. Each of the first clutch C1, first brake B1 and second clutch C2 is a known hydraulically-operated wet-type frictional engagement device that is to be frictionally engaged by operation of a hydraulic actuator. As described below, each of the first clutch C1 and the first brake B1 constitutes a part of the forward reverse switching device 26.

The engine 12 is provided with an engine control device 42 including an electronic throttle device, a fuel injection device, an ignition device and other devices that are required for controlling an output of the engine 12. In the engine 12, the engine control device 42 is controlled, by an electronic control apparatus 90 (that corresponds to a control apparatus recited in the appended claims), based on an operation amount θacc of an accelerator pedal that corresponds to a required drive force of the vehicle 10 required by an operator of the vehicle 10, whereby an engine torque Te of the engine 12 is controlled.

The torque converter 20 is provided with a pump impeller 20p and a turbine impeller 20t that are connected to the engine 12 and the input shaft 22, respectively. The drive-force transmitting apparatus 16 is provided with a mechanical oil pump 44 connected to the pump impeller 20p. The oil pump 44 is to be driven by the engine 12, to supply a working fluid pressure as its original pressure to a hydraulic control unit (hydraulic control circuit) 46 provided in the vehicle 10, for performing a shifting control operation in the continuously-variable transmission mechanism 24, generating a belt clamping force in the continuously-variable transmission mechanism 24, and switching an operation state of each of the above-described engagement devices between its engaged state and released state.

The forward/reverse switching device 26 includes a planetary gear device 26p of double-pinion type in addition to the first clutch C1 and the first brake B1. The planetary gear device 26p is a differential mechanism including three rotary elements consisting of an input element in the form of a carrier 26c, an output element in the form of a sun gear 26s and a reaction element in the form of a ring gear 26r. The carrier 26c is connected to the input shaft 22. The ring gear 26r is operatively connected to the casing 18 through the first brake B1. The sun gear 26s is connected to a small-diameter gear 48 that is provided to be coaxial with the input shaft 22 and rotatable relative to the input shaft 22. The carrier 26c and the sun gear 26s are operatively connected to each other through the first clutch C1.

The gear mechanism 28 includes, in addition to the above-described small-diameter gear 48, a gear-mechanism counter shaft 50 and a large-diameter gear 52 which meshes with the small-diameter gear 48 and which is provided to be coaxial with the gear-mechanism counter shaft 50 and unrotatable relative to the gear-mechanism counter shaft 50. The large-diameter gear 52 has a diameter larger than that of the small-diameter gear 48. The gear mechanism 28 further includes an idler gear 54 that is provided to be coaxial with the gear-mechanism counter shaft 50 and rotatable relative to the gear-mechanism counter shaft 50, and an output gear 56 that is provided to be coaxial with the output shaft 30 and unrotatable relative to the output shaft 30. The output gear 56 has a diameter larger than that of the idler gear 54. Therefore, the gear mechanism 28 provides a gear ratio between the input shaft 22 and the output shaft 30 in the first drive-force transmitting path PT1. That is, the gear mechanism 28 corresponds to a gear mechanism configured to provide at least one gear ratio. The gear mechanism 28 further includes a dog clutch D1 as an engagement device that is disposed on the gear-mechanism counter shaft 50 between the large-diameter gear 52 and the idler gear 54 so as to selectively connect and disconnect a drive-force transmitting path between the two gears 52, 54. The dog clutch D1 is configured to selectively connect and disconnect the first drive-force transmitting path PT1, such that the first drive-force transmitting path PT1 is established with engagement of the dog clutch D1. The dog clutch D1, which is also included in the above-described plurality of engagement devices, serves as an engagement device that cooperates with the first clutch C1 or the first brake B1 to establish the first drive-force transmitting path PT1. That is, the first drive-force transmitting path PT1 is established with bath of the dog clutch D1 and the first clutch C1 or both of the dog clutch D1 and the first brake B1 being engaged. An operation state of the dog clutch D1 is switched by operation of a hydraulic actuator knot shown) that is included in the drive-force transmitting apparatus 16.

The first drive-force transmitting path PT1 is established with both of the dog clutch D1 and the first engagement device being engaged, namely, with both of engagement of the dog clutch D1 and engagement of either one of the first clutch C1 and the first brake B1 which cooperate with each other to constitute the first engagement device and which are located to be closer to the input shaft 22 than the dog clutch D1. When the first clutch C1 as well as the dog clutch D1 is engaged, the first drive-force transmitting path PT1 for forward running of the vehicle 10 is established. When the first brake B1 as well as the dog clutch D1 is engaged, the first drive-force transmitting path PT1 for reverse running of the vehicle 10 is established. In the drive-force transmitting apparatus 16, with the first drive-force transmitting path PT1 being established, the drive-force transmitting apparatus 16 is placed in its drive-force transmittable state in which the drive force of the engine 12 is transmittable from the input shaft 22 to the output shaft 30 through the gear mechanism 28. With the first drive-force transmitting path PT1 being cut off by release of both of the first clutch C1 and the first brake B1 or by release of the dog clutch D1, the drive-force transmitting apparatus 16 is placed in its neutral state in which the drive force is not transmittable.

Figure 2:
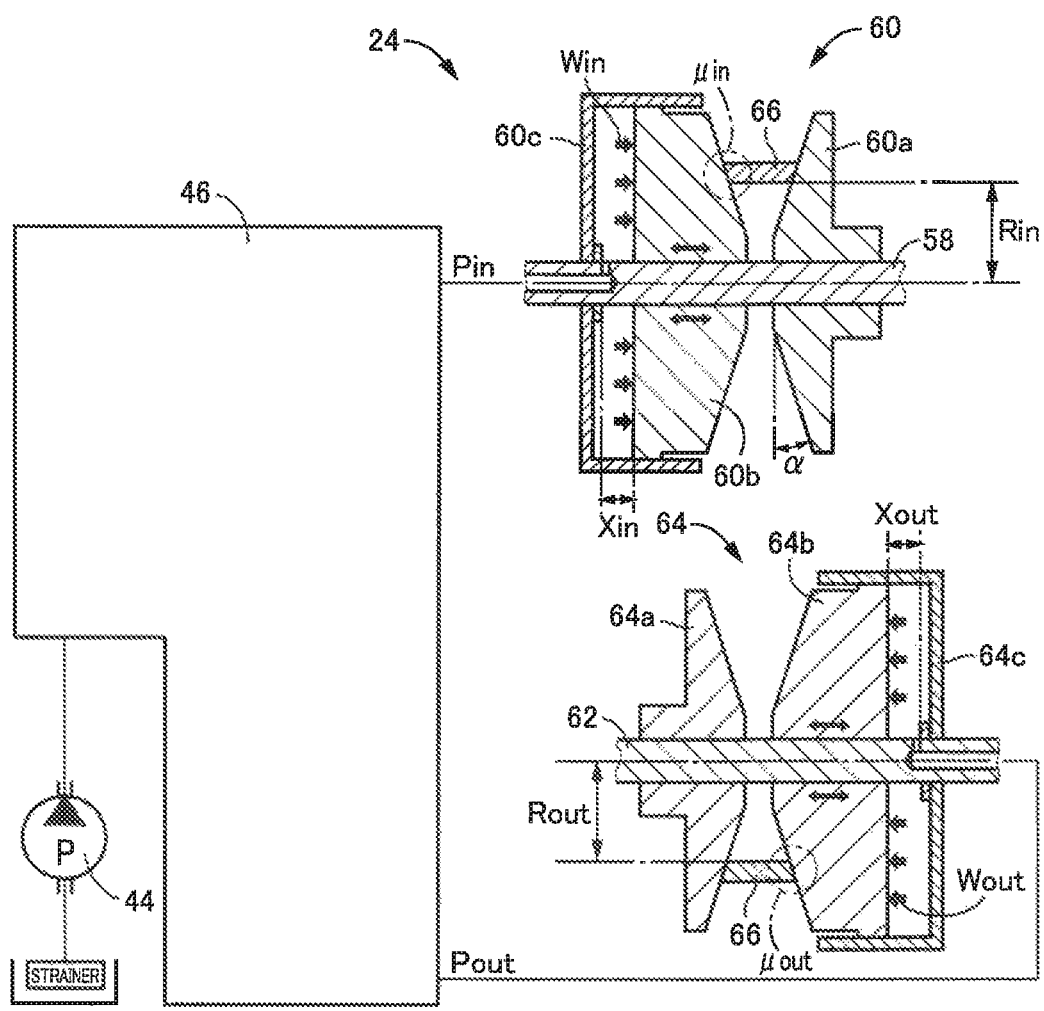
FIG. 2 is a view for explaining a construction of a continuously-variable transmission mechanism.

FIG. 2 is a view for explaining a construction of the continuously-variable transmission mechanism 24. As shown in FIGS. 1 and 2, the continuously-variable transmission mechanism 24 includes a primary shaft 58 provided to be coaxial with the input shaft 22 and connected integrally to the input shaft 22, a primary pulley 60 connected to the primary shaft 58 and having a variable effective diameter, a secondary shaft 62 provided to be coaxial with the output shaft 30, a secondary pulley 64 connected to the secondary shaft 62 and having a variable effective diameter, and a transfer element in the form of a transmission belt 66 looped over or mounted on the pulleys 60, 64. The continuously-variable transmission mechanism 24 is a known belt-type continuously-variable transmission in which the drive force is transmitted owing to a friction force generated between the transmission belt 66 and each of the pulleys 60, 64, and is configured to transmit the drive force of the engine 12 toward the drive wheels 14. The friction force is synonymous with a clamping force, and is referred also to as a belt clamping force. The belt clamping force corresponds to a belt torque capacity Tcvt that is a torque capacity of the transmission belt 66 in the continuously-variable transmission mechanism 24.

The primary pulley 60 includes a fixed sheave 60a connected to the primary shaft 58, a movable sheave 60b unrotatable about an axis of the primary shaft 58 and axially movable relative to the fixed sheave 60a, and a hydraulic actuator 60c configured to apply a primary thrust Win to the movable sheave 60b. The primary thrust Win is a thrust (=primary pressure Pin*pressure receiving area) for changing a width of a V-shaped groove defined between the fixed and movable sheaves 60a, 60b of the primary pulley 60. That is, the primary thrust Win is a thrust applied to the primary pulley 60 from the hydraulic actuator 60c, to clamp the transmission belt 66 that is mounted on the primary pulley 60. The primary pressure Pin is a hydraulic pressure supplied from the hydraulic control unit 46 to the hydraulic actuator 60c, and serves as a pulley hydraulic pressure for generating the primary thrust Win. Meanwhile, the secondary pulley 64 includes a fixed sheave 64a connected to the secondary shaft 62, a movable sheave 64b unrotatable about an axis of the secondary shaft 62 and axially movable relative to the fixed sheave 64a, and a secondary hydraulic actuator 64c configured t© apply a secondary thrust Wout to the movable sheave 64b. The secondary thrust Wout is a thrust (=secondary pressure Pout*pressure receiving area) for changing a width of a V-shaped groove defined between the fixed and movable sheaves 64a, 64b of the secondary pulley 64. That is, the secondary thrust Wout is a thrust applied to the secondary pulley 64 from the secondary hydraulic actuator 64c, to clamp the transmission belt 66 that is mounted on the secondary pulley 64. The secondary pressure Pout is a hydraulic pressure supplied from the hydraulic control unit 46 to the secondary hydraulic actuator 64c, and serves as a pulley hydraulic pressure for generating the secondary thrust Wout.

In the continuously-variable transmission mechanism 24, the primary and secondary pressures Pin, Pout are controlled by the hydraulic control unit 46 that is controlled by the electronic control apparatus 90, whereby the primary and secondary thrusts Win, Wout are respectively controlled. With the primary and secondary thrusts Win, Wout being controlled, the widths of the V-shaped grooves of the respective pulleys 60, 64 are controlled to be changeable whereby a belt winding diameter (effective diameter) of each of the pulleys 60, 64 is changeable and accordingly a gear ratio γcvt (=primary rotational speed Npri/secondary rotational speed Nsec) of the continuously-variable transmission mechanism 24 is changeable. Further, with the primary and secondary thrusts Win, Wout being controlled, the belt clamping force is controlled such that slipping of the transmission belt 66 is not caused. That is, with the primary and secondary thrusts Win, Wout being controlled, the gear ratio γcvt of the continuously-variable transmission mechanism 24 is controlled to a target gear ratio γcvttgt while the transmission belt 66 is prevented from being slipped. It is noted that the primary rotational speed Npri represents a rotational speed of the primary shaft 58 and that the secondary rotational speed. Nsec represents a rotational speed of the secondary shaft 62.

In the continuously-variable transmission mechanism 24, when the primary pressure Pin is increased, the width of the V-shaped groove of the primary pulley 60 is reduced whereby the gear ratio γcvt is reduced. The reduction of the gear ratio γcvt corresponds to a shift-up action performed in the continuously-variable transmission mechanism 24. In the continuously-variable transmission mechanism 24, the lowest gear ratio γmin is provided with the width of the V-shaped groove of the primary pulley 60 being minimized. Within a range of the gear ratio γcvt that can be provided by the continuously-variable transmission mechanism 24, the lowest gear ratio gear ratio γmin is a value of the gear ratio γcvt which makes it possible to maximize the running speed of the vehicle 10. Further, in the continuously-variable transmission mechanism 24, when the primary pressure Pin is reduced, the width of the V-shaped groove of the primary pulley 60 is increased whereby the gear ratio γcvt is increased. The increase of the gear ratio γcvt corresponds to a shift-down action performed in the continuously-variable transmission mechanism 24. In the continuously-variable transmission mechanism 24, the highest gear ratio γmax is provided with the width of the V-shaped groove of the primary pulley 60 being maximized. Within the range of the gear ratio γcvt that can be provided by the continuously-variable transmission mechanism 24, the highest gear ratio gear ratio γmax is a value of the gear ratio γcvt which makes it possible to minimize the running speed of the vehicle 10. In the continuously-variable transmission mechanism 24, the belt slippage is prevented by the primary thrust Win and the secondary thrust Wout, and the target gear ratio γcvttgt is established by a combination of the primary thrust Win and the secondary thrust Wont, rather than by only one of the primary thrust Win and the secondary thrust Wout. As described below, the gear ratio γcvt of the continuously-variable transmission mechanism 24 is changed with change of a thrust ratio τ (Wout/Win) which is a ratio of the secondary thrust Wout to the primary thrust Win and which is dependent on a relationship between the primary pressure Pin and the secondary pressure Pout. For example, the gear ratio γcvt is increased with increase of the thrust ratio τ, namely, a shift-down action of the continuously-variable transmission mechanism 24 is caused with increase of the thrust ratio τ.

The output shaft 30 is provided to be coaxial with the secondary shaft 62 and rotatable relative to the secondary shaft 62. The second clutch C2 is provided in a drive-force transmitting path (that corresponds to a part of the above-described second drive-force transmitting path PT2) between the secondary pulley 64 and the output shaft 30. The second drive-force transmitting path PT2 is established with engagement of the second clutch C2. In the drive-force transmitting apparatus 16, with the second drive-force transmitting path PT2 being established, the drive-force transmitting apparatus 16 is placed in its drive-force transmittable state in which the drive force of the engine 12 is transmittable from the input shaft 22 to the output shaft 30 through the continuously-variable transmission mechanism 24. With the second drive-force transmitting path PT2 being cut off by release of the second clutch C2, the drive-force transmitting apparatus 16 is placed in its neutral state in which the drive force is not transmittable. The gear ratio γcvt of the continuously-variable transmission mechanism 24 corresponds to a gear ratio established in the second drive-force transmitting path PT2.

In the drive-force transmitting apparatus 16, a gear ratio EL of the gear mechanism 28, which is a gear ratio ygear (=input-shaft rotational speed Nin/output-shaft rotational speed Nout) provided in the first drive-force transmitting path PT1, is higher than the above-described highest gear ratio γmax of the continuously-variable transmission mechanism 24 which is the highest gear ratio provided in the second drive-force transmitting path PT2. That is, the gear ratio EL is a value that makes it possible to reduce the running speed of the vehicle 10 more than the highest gear ratio γmax. The gear ratio EL of the gear mechanism 28 corresponds to a first-speed gear ratio γ1 in the drive-force transmitting apparatus 16. The highest gear ratio γmax of the continuously-variable transmission mechanism 24 corresponds to a second-speed gear ratio γ2 in the drive-force transmitting apparatus 16. Thus, any gear ratio provided in the second drive-force transmitting path PT2 is lower than the gear ratio provided in the first drive-force transmitting path PT1. It is noted that the input-shaft rotational speed Nin represents a rotational speed of the input shaft 22 and that the output-shaft rotational speed bout represents a rotational speed of the output shaft 30.

The vehicle 10 can run in a selected one of the gear running mode and the belt running mode. The gear running mode is a running mode in which the vehicle 10 runs with the drive force being transmitted through the first drive-force transmitting path PT1 that is established in the drive-force transmitting apparatus 16. The belt running mode is a running mode in which the vehicle 10 runs with the drive force being transmitted through the second drive-force transmitting path PT2 that is established in the drive-force transmitting apparatus 16. When forward running of the vehicle 10 is to be made in the gear running mode, the first clutch C1 and the dog clutch D1 are engaged while the second clutch C2 and the first brake B1 are released. When reverse running of the vehicle 10 is to be made in the gear running mode, the first brake B1 and the dog clutch D1 are engaged while the second clutch C2 and the first clutch C1 are released. In the belt running mode, forward running of the vehicle 10 can be made.

The gear running mode is selected to be established when the vehicle 10 runs at a running speed within a relative low speed range or when the vehicle 10 is stopped. The belt running mode is selected to be established when the vehicle 10 runs at a running speed within a relatively high speed range including a middle speed range as well as a high speed range. When the belt running mode is established in the middle speed range, the dog clutch D1 is engaged. When the belt running mode is established in the high speed range, the dog clutch D1 is released, for example, for the purpose of avoiding drag of the gear mechanism 28 and other elements during running of the vehicle 10 in the belt running mode and preventing gears of the gear mechanism 28 and components (such as pinion gears) of the planetary gear device 26p from being rotated at high speeds.

The vehicle 10 is provided with the electronic control apparatus 90 as a controller including the control apparatus constructed according to present invention. For example, the electronic control apparatus 90 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 90 is configured to perform, for example, an engine control operation for controlling an output of the engine 12, a shifting control operation and a belt-clamping-force control operation for the continuously-variable transmission mechanism 24, and a hydraulic-pressure control operation for switching the operation state of each of the plurality of engagement devices (C1, B1, C2, D1). The electronic control apparatus 90 may be constituted by two or more control units exclusively assigned to perform different control operations such as the engine control operation and the hydraulic-pressure control operation.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne which is a rotational speed of the engine 12; an output signal of a primary speed sensor 72 indicative of a primary rotational speed Npri which is a rotational speed of the primary shaft 58 which is equivalent to an input-shaft rotational speed Nin; an output signal of a secondary speed sensor 74 indicative of a secondary rotational speed Nsec which is a rotational speed of the secondary shaft 62; an output signal of an output speed sensor 76 indicative of an output-shaft rotational speed Nout which is a rotational speed of the output shaft 30 and which corresponds to the running speed V of the vehicle 10; an output signal of an accelerator-operation amount sensor 78 indicative of an accelerator operation amount θacc which represents an amount of accelerating operation made by a vehicle operator; an output signal of a throttle-opening degree sensor 80 indicative of the throttle opening degree tap; and an output signal of a shift position sensor 82 indicative of an operation position POSsh of a manually-operated shifting member in the form of a shift lever 84 provided in the vehicle 10. Further, the electronic control apparatus 90 generates various output signals which are supplied to various devices such as the engine control device 42 and the hydraulic control unit 46 and which include an engine-control command signal Se for controlling the engine 12, a hydraulic control command signal Scvt for performing hydraulic controls such as controls of the shifting action and the belt clamping force of the continuously-variable transmission mechanism 24, and a hydraulic-control command signal Scbd for performing hydraulic controls such as controls of operation states of the plurality of engagement devices. It is noted that the input-shaft rotational speed Nin (=primary rotational speed Npri) is equivalent to a rotational speed of the turbine impeller 20t of the of the torque converter 20. It is also noted that the primary rotational speed Npri is equivalent to a rotational speed of the primary pulley 60 and that the secondary rotational speed Nsec is equivalent to a rotational speed of the secondary pulley 64. Further, the electronic control apparatus 90 calculates an actual gear ratio γcvt (=Npri/Nsec) that is an actual value of the gear ratio γcvt of the continuously-variable transmission mechanism 24, based on the primary rotational speed Npri and the secondary rotational speed Nsec.

The shift lever 84 is operable to be placed in a selected one of a plurality of operation positions POSsh that consist of, for example, a parking position P, a reverse position R, a neutral position N and a drive position D. With the shift lever 84 being placed in the parking position P, the drive-force transmitting apparatus 16 is placed in its parking position in which the drive-force transmitting apparatus 16 is placed in its neutral state and rotation of the output shaft 30 is mechanically inhibited (locked). The drive-force transmitting apparatus 16 is placed in the neutral state, for example, by releasing all of the first clutch C1, first brake B1 and second clutch C2. That is, the neutral state is a state of the drive-force transmitting apparatus 16 in which neither the first drive-force transmitting path PT1 nor the second drive-force transmitting path PT2 is established. With the shift lever 84 being placed in the reverse position R, the drive-force transmitting apparatus 16 is placed in its reverse drive position for enabling the reverse running of the vehicle 10 in the gear running mode. With the shift lever 84 being placed in the neutral position N, the drive-force transmitting apparatus 16 is placed in its neutral position in Which the drive-force transmitting apparatus 16 is placed in its neutral state. With the shift lever 84 being placed in the drive position D, the drive-force transmitting apparatus 16 is placed in its forward drive position for enabling the forward running of the vehicle 10 in the gear running mode, or enabling the forward running of the vehicle 10 in the belt running mode with execution of an automatic shifting control of the continuously-variable transmission mechanism 24.

For performing various control operations in the vehicle 10, the electronic control apparatus 90 includes an engine control means or portion in the form of an engine control portion 92, a transmission shifting control means or portion in the form of a transmission-shifting control portion 94, an automatic running-speed control means or portion in the form of aa automatic running-speed control portion 96 and a state determining means or portion in the form of a state determining portion 98.

The engine control portion 92 calculates a target drive force Fwtgt, for example, by applying the accelerator operation amount θacc and the running velocity V to a predetermined or stored relationship (e.g., drive force map) that is obtained by experimentation or determined by an appropriate design theory. The engine control portion 92 sets a target engine torque Tetgt that ensures the target drive force Fwtgt, and outputs the engine-control command signal Se for controlling the engine 12 so as to obtain the target engine torque Tetgt. The outputted engine-control command signal Se is supplied to the engine control device 42.

When the operation position POSsh of the shift lever 84 is the parking position P or the neutral position N during stop of the vehicle 10, the transmission-shifting control portion 94 supplies, to the hydraulic control unit 46, the hydraulic-control command signal Scbd requesting engagement of the dog clutch D1, in preparation of transition to the gear running mode. When the operation position POSsh is switched from the parking position P or the neutral position N to the drive position D during stop of the vehicle 10, the transmission-shifting control portion 94 supplies, to the hydraulic control unit 46, the hydraulic-control command signal Scbd requesting engagement of the first clutch C1, whereby the gear running mode is established to enable forward running of the vehicle 10. When the operation position POSsh is switched from the parking position. P or the neutral position N to the reverse position. R during stop of the vehicle 10, the transmission-shifting control portion 94 supplies, to the hydraulic control unit 46, the hydraulic-control command signal Scbd requesting engagement of the first brake B1, whereby the gear running mode is established to enable reverse running of the vehicle 10.

When the operation position POSsh is the drive position 1), the transmission-shifting control portion 94 executes a switching control operation for switching the running mode between the gear running mode and the belt running mode. Specifically, the transmission-shifting control portion 94 determines whether shifting from one of first and second speed positions to the other is to be executed or not, by applying the running speed V and the accelerator operation amount θacc to a stepped shifting map in which shift-up lines, shift-down lines and hysteresis between each of the shift-up lines and a corresponding one of the shift-down lines are defined. The first speed position corresponds to the above-described gear ratio EL provided in the gear mechanism 28 by which the drive force is to be transmitted through the first drive-force transmitting path PT1 during the gear running mode. The second speed position corresponds to the above-described highest gear ratio γmax that is the highest one of the gear ratios (or that is a maximum value within a given range of a continuously-variable gear ratio) provided in the continuously-variable transmission mechanism 24 by which the drive force is to be transmitted through the second drive-force transmitting path PT2 during the belt running mode. Then, when determining that the shifting is to be executed, the transmission-shifting control portion 94 switches the running mode from one of the gear running mode and the belt running mode to the other, so as to execute shifting up or down from one of the first and second speed positions to the other.

When determining that the running mode is to be switched from the gear running mode to the belt running mode so as to execute the shifting up from the first speed position to the second speed position during running in the gear running mode, the transmission-shifting control portion 94 supplies, to the hydraulic control unit 46, the hydraulic-control command signal Scbd requesting releasing and engaging actions of the respective first and second clutches C1, C2, so as to perform a so-called "clutch to clutch" shifting operation. As a result of the shifting up from the first speed position to the second speed position, the second drive-force transmitting path PT2 is established in place of the first drive-force transmitting path PT1 in the drive-force transmitting apparatus 16. Thus, the transmission-shifting control portion 94 executes a stepped shifting control to release and engage the first and second clutches C1, C2, respectively, so as to cause the drive-force transmitting apparatus 16 to execute the shift-up action by which the selected running mode (i.e., selected state) is switched from the gear running mode (i.e., first state) in which the first drive-force transmitting path PT1 is established to the belt running mode (i.e., second state) in which the second drive-force transmitting path PT2 is established. In the following description relating to the present embodiment, the shift-up action, which is executed by the drive-force transmitting apparatus 16 to switch the selected running mode from the gear running mode to the belt running mode, will be referred to as "stepped shift-up action".

When determining that the running mode is to be switched from the belt running mode to the gear running mode so as to execute the shifting down from the second speed position to the first speed position during running in the belt running mode, the transmission-shifting control portion 94 supplies, to the hydraulic control unit 46, the hydraulic-control command signal Scbd requesting releasing and engaging actions of the respective second and first clutches C2, C1, so as to perform the clutch to clutch shifting operation. As a result of the shifting down from the second speed position to the first speed position, the first drive-force transmitting path PT1 is established in place of the second drive-force transmitting path PT2 in the drive-force transmitting apparatus 16. Thus, the transmission-shifting control portion 94 executes a stepped shifting control to engage and release the first and second clutches C1, C2, respectively, so as to cause the drive-force transmitting apparatus 16 to execute the shift-down action by which the selected running mode is switched from the belt miming mode in which the second drive-force transmitting path PT2 is established to the gear running mode in which the first drive-force transmitting path PT1 is established. In the following description relating to the present embodiment, the shift-down action, which is executed by the drive-force transmitting apparatus 16 to switch the selected running mode from the belt running mode to the gear running mode, will be referred to as "stepped shift-dawn action".

In the switching control operation for switching the running mode between the gear running mode and the belt running mode, the switching between the first and second drive-force transmitting paths PT1, PT2 is made by only the above-described clutch to clutch shifting operation for making a torque transfer via an transition state in which the dog clutch D1 is engaged in the belt running mode in the middle speed range, so that the switching control operation is performed with a shifting shock being restrained.

For executing a shifting action in the continuously-variable transmission mechanism 24 during the belt running mode, the transmission-shifting control portion 94 supplies, to the hydraulic control unit 46, the hydraulic-control command signal Scvt for controlling the primary pressure Pin and the secondary pressure Pout such that the target gear ratio γcvttgt is established in the continuously-variable transmission mechanism 24 while the belt slippage is not caused in the continuously-variable transmission mechanism 24. This hydraulic-control command signal Scvt includes a primary-pressure command signal Spin requesting the primary pressure Pin to become a target primary pressure Pintgt and a secondary-pressure command signal Spout requesting the secondary pressure Pout to become a target secondary pressure Pouttgt.

The target primary pressure Pintgt is a target value of the primary pressure Pin which causes generation of a primary target thrust Wintgt that is a target value of the primary thrust Win to be applied to the primary pulley 60. The target secondary pressure Pouttgt is a target value of the secondary pressure Pout which causes generation of a target secondary thrust Wouttgt that is a target value of the secondary thrust Wout to be applied to the secondary pulley 64. In calculation of each of the primary target thrust Wintgt and the secondary target thrust Wouttgt, a required thrust, which is minimally required to prevent the belt slippage on a corresponding one of the primary and secondary pulleys 60, 64, is taken into consideration. This required thrust is a belt-slip limit thrust Wlmt that is a thrust value shortly before occurrence of the belt slippage in the continuously-variable transmission mechanism 24. In the following description relating to the present invention, the belt-slip limit thrust Wlmt will be referred to as "slip limit thrust Wlmt".

Specifically, the transmission-shifting control portion 94 functionally includes a target-thrust calculating means or portion in the form of a target-thrust calculating portion 95. The target-thrust calculating portion 95 compares the secondary thrust Wout, which is calculated based on a primary-side slip limit thrust Winlmt that is the slip limit thrust Wlmt minimally required to prevent slippage of the transmission belt 66 on the primary pulley 60, with a secondary-side slip limit thrust Woutlmt that is the slip limit thrust Wlmt minimally required to prevent slippage of the transmission belt 66 on the secondary pulley 64, and then selects a larger one of the secondary thrust Wout and the secondary-side slip limit thrust Woutlmt. The secondary thrust Wout, which is calculated based on the primary-side slip limit thrust Winlmt, is a secondary-side shifting-control thrust Woutsh that is required to be applied to the second pulley 64 in a shifting control, as described below. Thus, the target-thrust calculating portion 95 calculates the secondary target thrust Wouttgt based on the primary thrust Win that is the primary-side slip limit thrust Winlmt.

The target-thrust calculating portion 95 sets, as the primary target thrust Wintgt, the primary thrust Win calculated based on the secondary target thrust Wouttgt. The primary thrust Win, which is calculated based on the secondary target thrust Wouttgt, is a primary-side shifting-control thrust Winsh that is required to be applied to the primary pulley 60 in a shifting control, as described below. Further, as described below, the target-thrust calculating portion 95 compensates the primary-side shifting-control thrust Winsh, namely, compensates the primary target thrust Wintgt, by a feedback control of the primary thrust Win that is executed based on a gear ratio deviation Δγcvt (=γcvttgt−γcvt) that is a deviation of the actual gear ratio γcvt from the target gear ratio γcvttgt.

In the above-described compensation of the primary-side shifting-control thrust Winsh, a deviation of an actual value from a target value in each parameter that has a one-to-one correspondence relationship with the gear ratio γcvt may be used in place of the gear ratio deviation Δγcvt. For example, in the compensation of the primary-side shifting-control thrust Winsh, it is possible to use a deviation ΔXin (=Xintgt−Xin) of an actual position Xin of the movable sheave 60b from a target position Xintgt of the movable sheave 60b in the primary pulley 60 (see FIG. 2), a deviation ΔXout (=Xoutgt−Xout) of an actual position Xout of the movable sheave 64b from a target position Xintgt of the movable sheave 64b in the secondary pulley 64 (see FIG. 2), a deviation ΔRin (=Rintgt−Rin) of an actual belt-winding diameter (actual effective diameter) Rin from a target belt-winding diameter (target effective diameter) Rintgt in the primary pulley 60 (see FIG. 2), a deviation ΔRout (=Routtgt−Rout) of an actual belt-winding diameter (actual effective diameter) Rout from a target belt-winding diameter (target effective diameter) Routtgt in the secondary pulley 64 (see FIG. 2), and a deviation ΔNpri (=Npritgt−Npri) of an actual primary rotational speed Npri from a target primary rotational speed Npritgt.

Each of the above-described primary-side shifting-control thrust Winsh and secondary-side shifting-control thrust Woutsh is a thrust required to be applied to a corresponding one of the primary and secondary pulleys 60, 64 in a shifting control to execute a desired shifting action to establish the target gear ratio γcvttgt at a target shifting speed dγtgt (that is a target value of a shifting speed dγ). The shifting speed dγ is a rate (=dγcvt/dt) of change of the gear ratio γcvt, namely, an amount (=dγcvt/dt) of change of the gear ratio γcvt per a unit of time. In the present embodiment, the shifting speed dγ is defined as an amount (=dX/dNelm) of pulley displacement per an element of the transmission belt 66, wherein "dX" represents an amount of displacement of the pulley in an axial direction of the pulley per a unit of time, and "dNelm" represents a number of elements (of the transmission belt 66) that are caused to bite into the pulley (i.e., caused to enter the V-shaped groove of the pulley) per the unit of time. The shifting speed dγ is represented by a primary shifting speed dγin (=dXin/dNelmin) and a secondary shifting speed dγout (=d Xout/dNelmout).

The thrust, which is applied to each of the pulleys 60, 64 in a steady state in which the gear ratio γcvt is constant, is referred to as "balance thrust Wbl" that is referred also to as "steady thrust". The thrust ratio r is represented as a ratio (=Woutbl/Winbl) of a secondary balance thrust Woutbl to a primary balance thrust Winbl, wherein the secondary balance thrust Woutbl is the balance thrust Wbl of the secondary pulley 64 and the primary balance thrust Winbl is the balance thrust Wbl of the primary pulley 60. On the other hand, in the steady state, if one of the thrusts applied to the respective pulleys 60, 64 is increased or reduced by a certain amount, the steady state is lost whereby the gear ratio γcvt is changed thereby generating the shifting speed dγ that corresponds to the certain amount by which the one of the thrusts is increased or reduced. The certain amount, by which the thrust is increased or reduced, will be referred to as "gear-ratio changing thrust ΔW" that is referred also to as "transient thrust". Where the gear ratio γcvt is changed to the target gear ratio γcvttgt by changing the thrust applied to the primary pulley 60, the gear-ratio changing thrust ΔW is represented by a primary gear-ratio changing thrust ΔWin that corresponds to an amount by which the thrust applied to the primary pulley 60 is increased or reduced. Where the gear ratio γcvt is changed to the target gear ratio γcvttgt by changing the thrust applied to the secondary pulley 64, the gear-ratio changing thrust ΔW is represented by a secondary gear-ratio changing thrust ΔWout that corresponds to an amount by which the thrust applied to the secondary pulley 64 is increased or reduced.

Where one of the primary-side shifting-control thrust Winsh and secondary-side shifting-control thrust Woutsh, which are thrusts required to be applied to the respective primary and secondary pulleys 60, 64 in a shifting control, has been set, the other of the primary-side shifting-control thrust Winsh and secondary-side shifting-control thrust Woutsh is set to a sum of the balance thrust Wbl and the gear-ratio changing thrust ΔW, wherein the balance thrust Wbl is dependent on the above-described one of the primary-side shifting-control thrust Winsh and secondary-side shifting-control thrust Woutsh and the thrust ratio τ corresponding to the target gear ratio γcvttgt, and the gear-ratio changing thrust ΔW corresponds to the target shifting speed dγtgt of change of the target gear ratio γcvttgt. The target shifting speed dγtgt is represented by a primary target shifting speed dγintgt and a secondary target shifting speed dγouttgt. The primary gear-ratio changing thrust ΔWin is a positive value (ΔWin>0) that is larger than zero in a shift-up state in which the gear ratio γcvt is to be reduced, and is a negative value (ΔWin<0) that is smaller than zero in a shift-down state in which the gear ratio γcvt is to be increased. The primary gear-ratio changing thrust ΔWin is zero (ΔWin=0) in a steady state in which the gear ratio γcvt is constant. Further, the secondary gear-ratio changing thrust ΔWout is a negative value (ΔWout<0) that is smaller than zero in the shift-up state, and is a positive value (ΔWout>0) that is larger than zero in the shift-down state. The secondary gear-ratio changing thrust ΔWout is zero (ΔWout=0) in the steady state.

Figure 3:
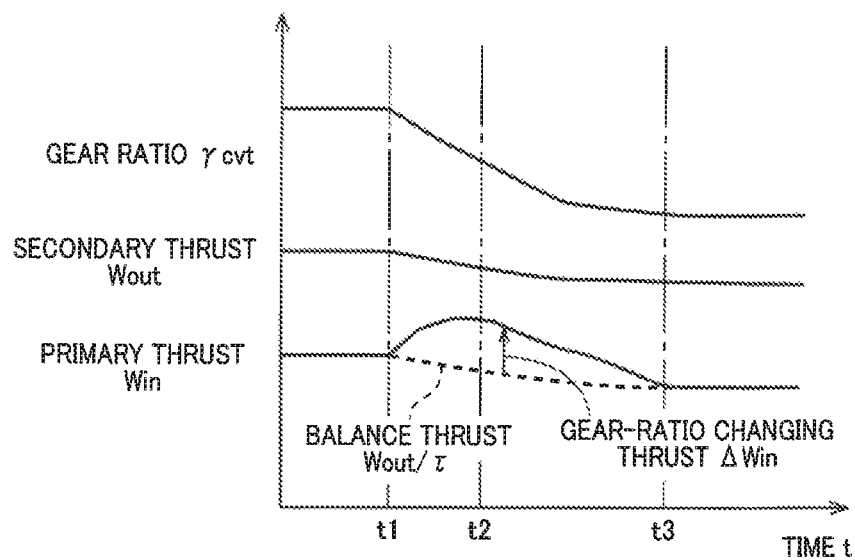
FIG. 3 is a view showing an example for explaining thrusts required for a shifting control.
Figure 4:
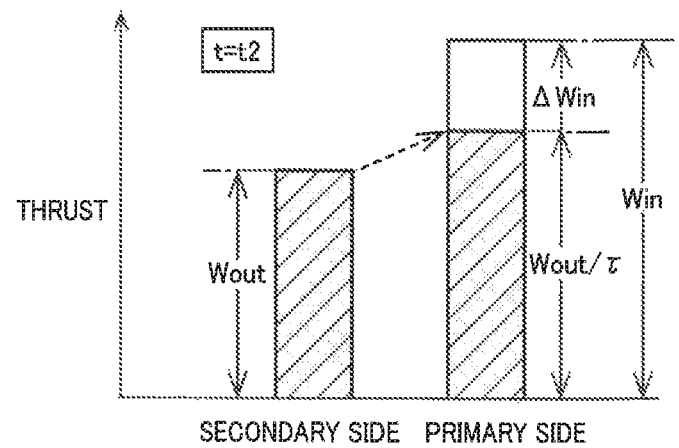
FIG. 4 is a view showing, by way of example, a relationship between the thrusts at a point t2 of time shown in FIG. 3.

FIG. 3 is a view showing an example for explaining thrusts required for a shifting control. FIG. 4 is a view showing, by way of example, a relationship between the thrusts at a point t2 of time shown in FIG. 3. FIGS. 3 and 4 show, by a way of example, the primary thrust Win that is set in a case where a desired shift-up action is executed by increasing the primary thrust Win while setting the secondary thrust Wont to prevent a belt slippage on the secondary pulley 64. As shown in FIG. 3, at a stage until a point t1 of time and a stage from a point t3 of time, namely, in the steady state in which the target gear ratio γcvttgt is constant with the primary gear-ratio changing thrust ΔWin is zero, the primary thrust Win consists of only the primary balance thrust Winbl (=Wout/τ). At a stage from the point t1 of time until the point t3 of time, namely, in the shift-up state in which the target gear ratio γcvttgt is reduced, the primary thrust Win corresponds to a sum of the primary balance thrust Winbl and the primary gear-ratio changing thrust ΔWin, as shown, in FIG. 4. In FIG. 4, a hatched portion of each of the primary and secondary thrusts Win, Wout corresponds to a corresponding one of the primary and secondary balance thrusts Winbl, Woutbl that are required at the point t2 of time shown in FIG. 3 to maintain the target gear ratio γcvttgt.

Figure 5:
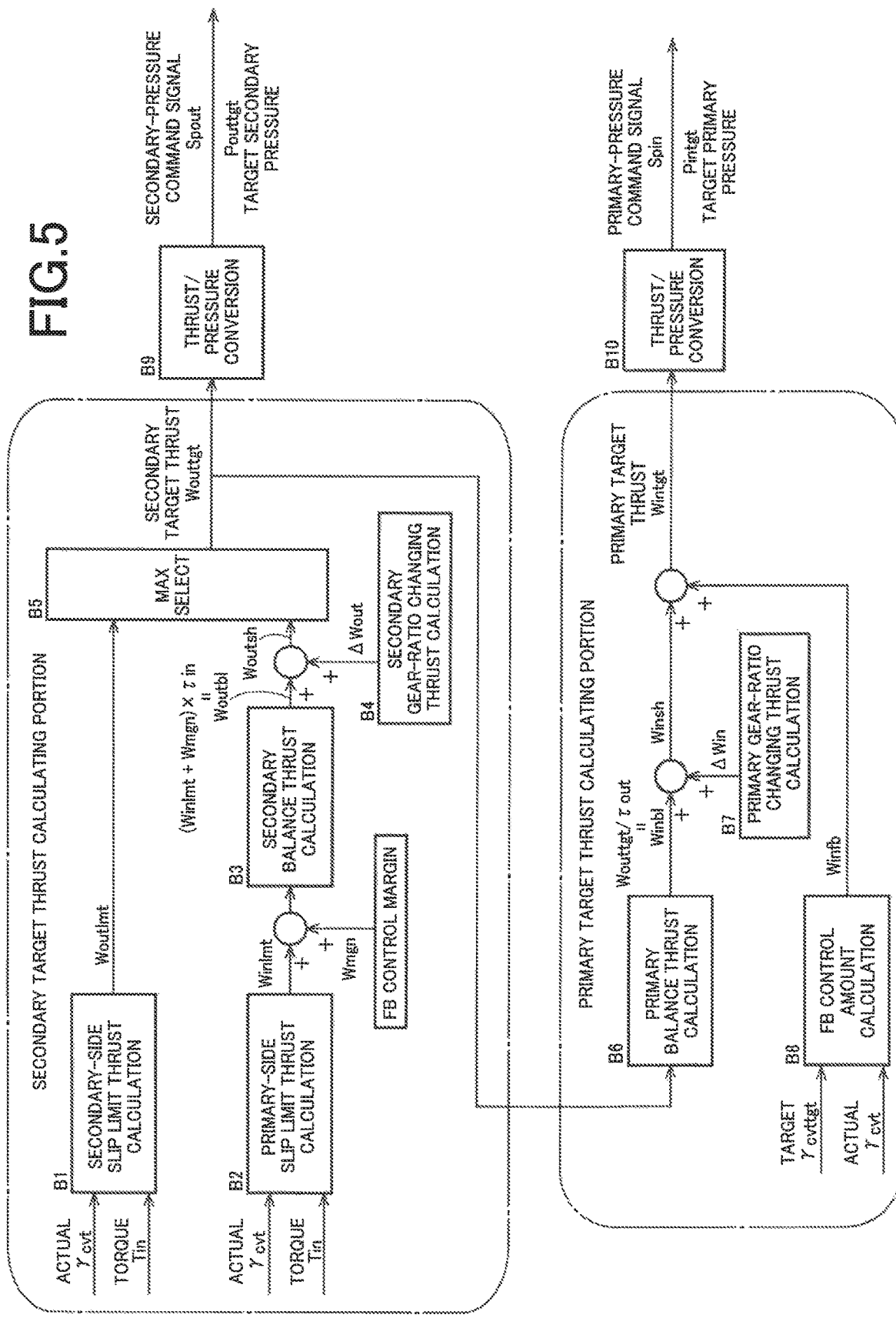
FIG. 5 is a block diagram showing an arrangement for controls performed to prevent a belt slippage and establish a target gear ratio, with minimally required thrusts.

FIG. 5 is a block diagram showing an arrangement for controls performed to prevent a belt slippage and establish a target gear ratio, with minimally required thrusts, for explaining a hydraulic control, i.e., a CVT hydraulic control executed in the continuously-variable transmission mechanism 24.

FIG. 5 is a block diagram showing an arrangement for controls performed to prevent a belt slippage and execute a desired shifting action, with minimally required thrusts. In FIG. 5, the transmission-shifting control portion 94 calculates the target gear ratio γcvttgt. Specifically, the transmission-shifting control portion 94 calculates the target primary rotational speed Npritgt by applying the accelerator operation amount θacc and the vehicle running speed V into a predetermined relationship in the form of a CVT shifting map. Then, the transmission-shifting control portion 94 calculates, based on the target primary rotational speed Npritgt, a post-shifting target gear ratio γcvttgtl (=Npritgt/ Nsec) that is the gear ratio γcvt to be established after the shifting action executed in the continuously-variable transmission mechanism 24. In order that the shifting action is executed rapidly and smoothly, the transmission-shifting control portion 94 determines the target gear ratio γcvttgt as a transient target value of the gear ratio γcvt in process of the shifting action, based on a pre-shifting gear ratio γcvt (i.e., gear ratio γcvt before the shifting action) and the post-shifting target gear ratio γcvttgtl, according to a relationship predetermined to cause the shifting action to be executed rapidly and smoothly. For example, the transmission-shifting control portion 94 determines the target gear ratio γcvttgt (that is to be changed in process of the shifting action) as a function that is changed, along a curved line whose inclination is smoothly changed, toward the post-shifting target gear ratio γcvttgtl, with lapse of time from initiation of the shifting action. This smoothly curved line is, for example, a first-order lag curve or a second-order lag curve. When determining the target gear ratio γcvttgt, the shifting control portion 94 calculates the target shifting speed dγtgt, based on the target gear ratio γcvttgt as the time function. When the target gear ratio γcvttgt becomes constant upon completion of the shifting action, namely, when the continuously-variable transmission mechanism 24 is brought back into the steady state, the shifting speed dγtgt becomes zero.

The transmission-shifting control portion 94 calculates a slip-limit-thrust calculation torque Tin that is a torque used to calculate the slip limit thrust Wlmt. Specifically, the transmission-shifting control portion 94 calculates an estimated value of the engine torque Te, for example, by applying the throttle opening degree tap and the engine rotational speed Ne to a predetermined relationship such as an engine torque map. The transmission-shifting control portion 94 calculates a turbine torque Tt, based on the estimated value of the engine torque Te and a predetermined relationship such as characteristic of the torque converter 20. The calculated turbine torque Ti is an estimated value of the input torque inputted to the continuously-variable transmission mechanism 24. In the following description relating to the present embodiment, the estimated value of the input torque inputted to the continuously-variable transmission mechanism 24 is referred to as "belt-portion input torque Tb". Basically, the belt-portion input torque Tb may be handled as the slip-limit-thrust calculation torque Tin. However, in view of variation or the like, it is not preferable that the slip limit thrust Wlmt is regarded as zero when the belt-portion input torque Tb is zero. Further, in view of accuracy of calculation of the belt-portion input torque Tb, when the belt-portion input torque Tb is a negative value during a driven state of the vehicle 10 (i.e., a state in which the vehicle 10 does not drive itself), it is preferable that the slip-limit-thrust calculation torque Tin is considered as a torque that is dependent on the belt-portion input torque Tb. Therefore, as the slip-limit-thrust calculation torque Tin during a driving state of the vehicle 10 (i.e., a state in which the vehicle 10 drives itself), a driving-state input torque Tdrv, which is obtained through a lower-limit guard processing applied to the belt-portion input torque Tb, is used. Further, as the slip-limit-thrust calculation torque Tin during the driven state of the vehicle 10, a driven-state input torque Tdrv, which is dependent on the belt-portion input torque Tb, is used. The driven-state input torque Tdrvn is a positive value larger than an absolute value of the belt-portion input torque Tb. When the vehicle 10 is in the driving state, the transmission-shifting control portion 94 selects, as the driving-state input torque Tdrv, a larger one of the belt-portion input torque Tb and a lower-limit torque Tinlim, and then sets the slip-limit-thrust calculation torque Tin to the driving-state input torque Tdrv (that is the larger one of the belt-portion input torque Tb and the lower-limit torque Tinlim). The lower-limit torque Tinlim is a positive value that is predetermined for increasing the slip-limit-thrust calculation torque Tin so as to more reliably prevent a belt slippage in view of a variation. When the vehicle 10 is in the driven state, the transmission-shifting control portion 94 sets the slip-limit-thrust calculation torque Tin to the driven-state input torque Tdrvn. Thus, the slip-limit-thrust calculation torque Tin is a torque based on the input torque inputted to the continuously-variable transmission mechanism 24, namely, based on the belt-portion input torque Tb. It is noted that the driving state of the vehicle 10 corresponds to a state in which the vehicle 10 tends to be accelerated, for example, and that the driven state of the vehicle 10 corresponds to a state in which the vehicle 10 tends to be decelerated, for example.

At each of blocks B1 and B2 shown in FIG. 5, the target-thrust calculating portion 95 calculates the slip limit thrust Wlmt, based on the actual gear ratio γcvt and the slip-limit-thrust calculation torque Tin. Specifically, the target-thrust calculating portion 95 calculates the secondary-side slip limit thrust Woutlmt, by using an equation (1) given below, and calculates the primary-side slip limit thrust Winlmt, by using an equation (2) given below. In the equations (1) and (2), "Tin" represents the slip-limit-thrust calculation torque Tin; "Tout" represents a torque (=γcvt*Tin=(Rout/Rin)*Tin) corresponding to the slip-limit-thrust calculation torque Tin converted onto the secondary pulley 64; "α" represents a sheave angle of each of the pulleys 60, 64 (see FIG. 2), "μin" represents an element/pulley friction coefficient in the primary pulley 60 (i.e., coefficient of friction acting between the transmission belt 66 and the primary pulley 60), "μout" represents an element/pulley friction coefficient in the secondary pulley 64 (i.e., coefficient of friction acting between the transmission belt 66 and the secondary pulley 64), "Rin" represents ½ of the belt winding diameter (effective diameter) of the primary pulley 60, which is uniquely calculated based on the actual gear ratio γcvt (see FIG. 2), and "Rout" represents ½ of the belt winding diameter (effective diameter) of the secondary pulley 64, which is uniquely calculated based on the actual gear ratio γcvt (see FIG. 2).

$$Woutlmt = (Tout*\cos\alpha)/(2*\mu out*Rout) = (Tin*\cos\alpha)(2*\mu out*Rin) \quad (1)$$

$$Winlmt = (Tin*\cos\alpha)/(2*\mu in*Rin) \quad (2)$$

At each of blocks B3 and B6 shown in FIG. 5, the target-thrust calculating portion 95 calculates the balance thrust Wbl. That is, the target-thrust calculating portion 95 calculates the secondary balance thrust Woutbl based on the primary-side primary-side slip limit thrust Winlmt, and calculates the primary balance thrust Winbl based on the secondary target thrust Wouttgt.

Figure 6:
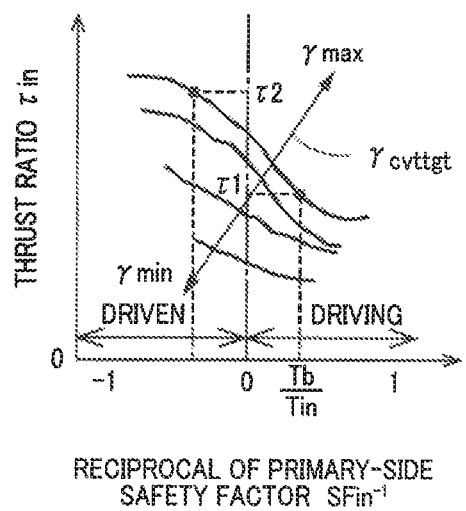
FIG. 6 is a view showing, by way of example, a thrust ratio map for calculating a first value of a thrust ratio, which is used to calculate the thrust to be applied to a secondary pulley.
Figure 7:
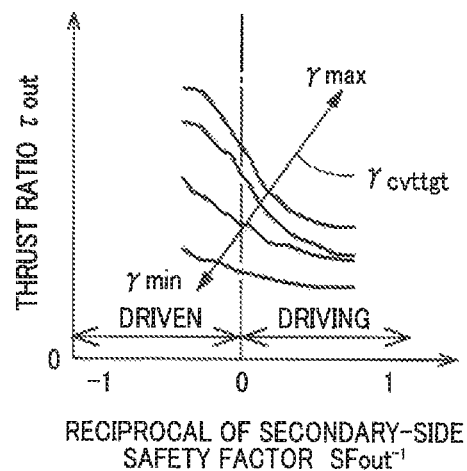
FIG. 7 is a view showing, by way of example, a thrust ratio map for calculating a second value of the thrust ratio, which is used to calculate the thrust to be applied to a primary pulley.

Specifically, the target-thrust calculating portion 95 calculates a thrust ratio τin that corresponds to or establishes the target gear ratio γcvttgt, for example, by applying the target gear ratio γcvttgt and a reciprocal SFin$^{-1}$ of a primary-side safety factor SFin to a thrust ratio map (τin) shown in FIG. 6. The thrust ratio map (τin) is a predetermined relationship between the reciprocal. SFin$^{-1}$ of the primary-side safety factor SFin and the thrust ratio τin, with a parameter in the form of the target gear ratio γcvttgt. The thrust ratio τin is a thrust ratio (first value) that is used to calculate the thrust applied to the secondary pulley 64, based on the thrust applied to the primary pulley 60. The target-thrust calculating portion 95 calculates the secondary balance thrust Woutbl based on the primary-side slip limit thrust Winlmt and the thrust ratio τin, by using equation (3) given below. The primary-side safety factor SFin is, for example, "Win/Winlmt" or "Tin/Tb", and the reciprocal SFin$^{-1}$ of the primary-side safety factor SFin is, for example, "Winlmt/Win" or "Tb/Tin". Further, the target-thrust calculating portion 95 calculates a thrust ratio τout that corresponds to or establishes the target gear ratio γcvttgt, for example, by applying the target gear ratio γcvttgt and a reciprocal SFout$^{-1}$ (=Woutlmt/Wout) of a secondary-side safety factor SFout to a thrust ratio map (τout) shown in FIG. 7. The thrust ratio map (τout) is a predetermined relationship between the reciprocal SFout$^{-1}$ of the secondary-side safety factor SFout and the thrust ratio τout, with a parameter in the form of the target gear ratio γcvttgt. The thrust ratio τout is a thrust ratio (second value) that is used to calculate the thrust applied to the primary pulley 60, based on the thrust applied to the secondary pulley 64. The target-thrust calculating portion 95 calculates the primary balance thrust Winbl based on the secondary target thrust Wouttgt and the thrust ratio τout, by using equation (4) given below. The secondary-side safety factor SFout is, for example, "Wout/Woutlmt" or "Tin/Tb", and the reciprocal SFout$^{-1}$ of the secondary-side safety factor SFout is, for example, "Woutlmt/Win" or "Tb/Tin". When the vehicle 10 is in the driving state, a driving-state range of the thrust ratio τ is used. When the vehicle 10 is in the driven state, a driven-state range of the thrust ratio τ is used. Each of the reciprocals SFin$^{-1}$, SFout$^{-1}$ may be calculated each time when the balance thrust Wbl is to be calculated. Or alternatively, where each of the safety factors SFin, SFout is set to a predetermined value (e.g., about 1.0-1.5), each of the reciprocals SFin$^{-1}$, SFout$^{-1}$ may be reciprocals of such safety factor that is set to the predetermined value.

$$Woutbl=Winlmt*\tau in \quad (3)$$

$$Winbl=Wouttgt/\tau out \quad (4)$$

As described above, each of the slip limit thrusts Winlmt, Woutlmt is calculated based on the slip-limit-thrust calculation torque Tin that is based on the belt-portion input torque Tb. The reciprocals SFin$^{-1}$, SFout$^{-1}$ of the respective safety factors SFin, SFout, based on which the thrust ratios τin, τout are calculated, are values based on the belt-portion input torque Tb. Thus, the target-thrust calculating portion 95 calculates the thrust ratio r that establishes the target gear ratio γcvttgt of the continuously-variable transmission mechanism 24, based on the belt-portion input torque Tb.

At each of blocks B4 and B7 shown in FIG. 5, the target-thrust calculating portion 95 calculates the gear-ratio changing thrust ΔW. That is, the target-thrust calculating portion 95 calculates the secondary gear-ratio changing thrust ΔWout and the primary gear-ratio changing thrust ΔWin.

Figure 8:
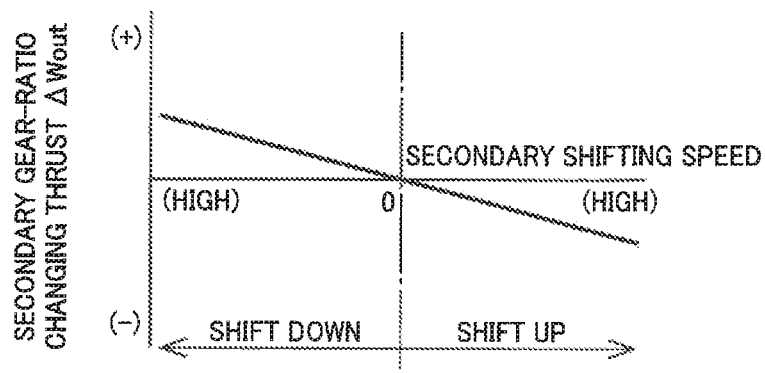
FIG. 8 is a view showing, by way of example, a gear-ratio-changing thrust map for calculating a secondary gear-ratio changing thrust.
Figure 9:
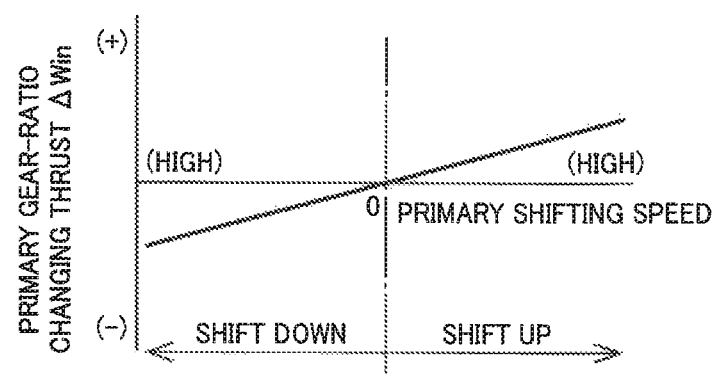
FIG. 9 is a view showing, by way of example, a gear-ratio-changing thrust map for calculating a primary gear-ratio changing thrust.

Specifically, the target-thrust calculating portion 95 calculates the secondary gear-ratio changing thrust ΔWout, for example, by applying the secondary target shifting speed dγouttgt to a gear-ratio-changing thrust map (ΔWout) shown in FIG. 8. The gear-ratio-changing thrust map (ΔWout) represents, by way of example, a predetermined relationship between the secondary shifting speed dγout and the secondary gear-ratio changing thrust ΔWout. The target-thrust calculating portion 95 calculates, as the secondary thrust required to prevent a belt slippage on the primary pulley 60, a secondary-side shifting-control thrust Woutsh (=Woutbl+ΔWout), by adding the secondary gear-ratio changing thrust ΔWout to the secondary balance thrust Woutbl. Further, the target-thrust calculating portion 95 calculates the primary gear-ratio changing thrust ΔWin, for example, by applying the primary target shifting speed dγintgt to a gear-ratio-changing thrust map (ΔWin) shown in FIG. 9. The gear-ratio-changing thrust map (ΔWin) represents, by way of example, a predetermined relationship between the primary shifting speed dγin and the primary gear-ratio changing thrust ΔWin. The target-thrust calculating portion 95 calculates a primary-side shifting-control thrust Winsh (=Winbl+ΔWin), by adding the primary gear-ratio changing thrust ΔWin to the primary balance thrust Winbl.

In calculations made at the above-described blocks B3 and B4, a predetermined physical characteristic diagram such as the thrust ratio map (τin) shown in FIG. 6 and the gear-ratio-changing thrust map (ΔWout) shown in FIG. 8 is used. Therefore, in a result of calculation of each of the secondary balance thrust Woutbl and the secondary gear-ratio changing thrust ΔWout, there exists a variation that is dependent on an individual difference of a hard unit such as the hydraulic control unit 46 in terms of physical characteristics. Where such a variation in terms of the physical characteristics is taken into consideration, the target-thrust calculating portion 95 may add a control margin Wmgn to the primary-side slip limit thrust Winlmt. The control margin Wmgn is a predetermined thrust that corresponds to the variation in terms of the physical characteristics which could affect the calculation of each of the secondary balance thrust Woutbl and the secondary gear-ratio changing thrust ΔWout. Where the variation in terms of the physical characteristics is taken into consideration, the target-thrust calculating portion 95 calculates the secondary balance thrust Woutbl by using an equation "Woutbl=(Winlmt+Wmgn)*τin" shown in FIG. 5 in place of the above-described equation (3). It is noted that the calculation could be affected by the variation in terms of the physical characteristics as well as the variation in term of an actual value of the pulley hydraulic-pressure that is generated in response to the hydraulic-control command signal Scvt, and that the calculation could be affected by the variation in terms of the physical characteristics by a degree, which could be relatively large depending on a kind of hard unit (such as the hydraulic control unit 46) having the individual difference. However, in general, the degree by which the calculation could be affected by the variation in the physical characteristics is extremely small as compared with a degree by which the calculation could be affected by the variation in the actual value of the pulley hydraulic-pressure.

At block B5 shown in FIG. 5, the target-thrust calculating portion 95 selects, as the secondary target thrust Wouttgt, a larger one of the secondary-side lower-limit thrust Woutlmt (g) and the secondary-side shifting-control thrust Woutsh.

At block B8 shown in FIG. 5, the target-thrust calculating portion 95 calculates a feedback control amount Winfb. Specifically, the target-thrust calculating Portion 95 calculates a feedback control amount (=FB control amount) Winfb that makes the actual gear ratio γcvt coincident with the target gear ratio γcvttgt, by using a feedback-control formula in the form of equation (5) given below. In the equation (5), "Δγcvt" represents the gear ratio deviation Δγcvt, "Kp" represents a predetermined proportionality constant, "Ki" represents a predetermined integral constant, and "Kd" represents a predetermined differential constant. The target-thrust calculating portion 95 calculates, as the primary target thrust Wintgt, an amended value (=Winsh+Winfb) of the feedback control amount Winfb that is amended by a feedback control, by adding the feedback control amount Winfb to the primary-side shifting-control thrust Winsh.

$$Winfb=Kp*\Delta\gamma cvt\ Ki*(\int\Delta\gamma cvtdt)+Kd*(d\Delta\gamma cvt/dt) \quad (5)$$

At each of blocks B9 and B10 shown in FIG. 5, the transmission-shifting control portion 94 converts the target thrust into a target pulley pressure. Specifically, the transmission-shifting control portion 94 converts the primary target thrust Wintgt into a target primary pressure Pintgt (=Wintgt/pressure receiving area), based on the pressure receiving area of the primary hydraulic actuator 60c, and converts the secondary target thrust Wouttgt into a target secondary pressure Pouttgt (=Wouttgt/pressure receiving area), based on the pressure receiving area of the secondary hydraulic actuator 64c. The transmission-shifting control portion 94 sets the primary-pressure command signal Spin representing the target primary pressure Pintgt and the secondary-pressure command signal Spout representing the target secondary pressure Pouttgt.

The transmission-shifting control portion 94 supplies the hydraulic-control command signal Scvt in the form of the primary-pressure command signal Spin and the secondary-pressure command signal Spout, to the hydraulic control unit 46, for thereby obtaining the target primary pressure Pintgt and the target secondary pressure Pouttgt. The hydraulic control unit 46 regulates the primary pressure Pin and the secondary pressure Pout, in accordance with the supplied hydraulic-control command signal Scvt.

The automatic running-speed control portion 96 executes an automatic running-speed control to change a drive-force related value that is used to control an actual running speed V (that is an actual value of the vehicle running speed V) such that the actual running speed V coincides with a target running speed Vtgt (that is a target value of the vehicle running speed V). The drive-force related value, which is used to control the actual running speed V, is a manipulated variable such as the engine torque Te which is the output torque outputted from the engine 12, a belt-portion input torque Tb which is equivalent to the turbine torque it and which is the input torque inputted to the continuously-variable transmission mechanism 24, a driveshaft torque Tds which is a torque acting on the axles 40, a drive torque Tw which is a torque acting on the drive wheels 14 and the drive force Fw which is equivalent to the drive torque Tw. The drive-force related value, which is used to control the actual running speed V, is a physical quantity in the process of transmission of a power or drive force of the engine 12. The automatic running-speed control is, for example, a known cruise control executed to control the drive force Fw such that the running speed V follows the target running speed Vtgt that is set by the vehicle operator. Or alternatively, the automatic running-speed control is, for example, a known a running-speed limiting control (ASL: Adjustable Speed Limiter) executed to control the drive force Fw such that the running speed V does not exceed the target running speed Vtgt set by the vehicle operator.

Figure 10:
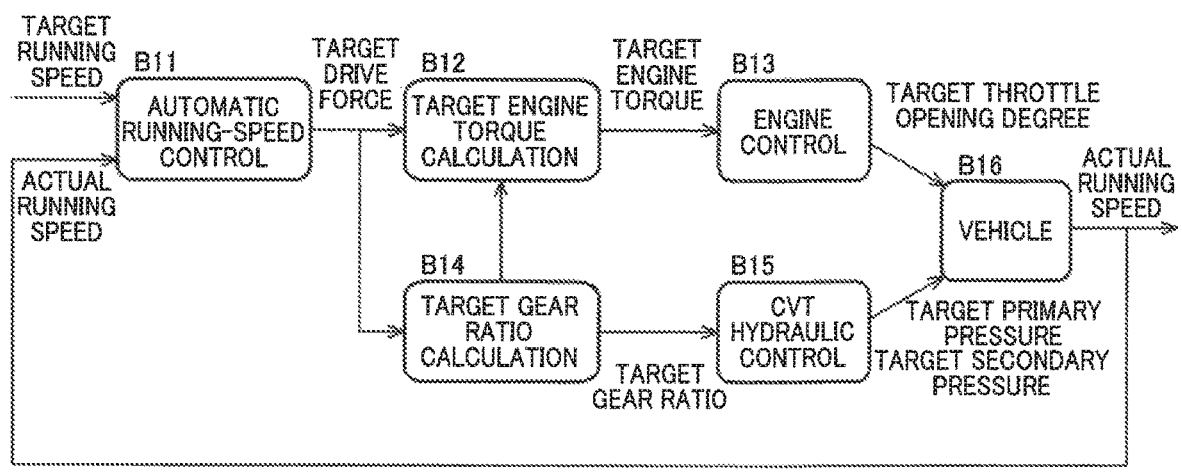
FIG. 10 is a block diagram explaining control operations relating to an automatic running-speed control.

FIG. 10 is a block diagram explaining control operations relating to the automatic running-speed control. At block B11 shown in FIG. 10, the automatic running-speed control portion 96 calculates a running-speed-control target drive force Fwtgtv that is a target value of the drive force Fw, which is used in the automatic running-speed control to cause the actual running speed V to coincide with the target running speed Vtgt set by the vehicle operator.

At block B12 shown in FIG. 10, the engine control portion 92 calculates a running-speed-control target engine torque Tetgtv for establishing the above-described running-speed-control target drive force Fwtgtv. In this instance, the running-speed-control target drive force Fwtgtv is converted into the running-speed-control target engine torque Tetgtv, wherein the conversion is made with use of a running-speed-control target gear ratio γcvttgtv that is calculated at block B14 described below.

At block B13 shown in FIG. 10, the engine control portion 92 calculates a running-speed-control target throttle opening degree taptgtv that makes it possible to obtain the above-described running-speed-control target engine torque Tetgtv, by using, for example, the above-described engine torque map. The engine control portion 92 supplies, to the engine control device 42, the engine-control command signal Se requesting the throttle opening degree tap to coincide with the calculated running-speed-control target throttle opening degree taptgtv and the engine-control command signal Se containing an injection signal and an ignition timing signal, for obtaining the running-speed-control target engine torque Tetgtv.

At block B14 shown in FIG. 10, the transmission-shifting control portion 94 calculates a running-speed-control target primary rotational speed Npritgtv, by applying the running-speed-control target drive force Fwtgtv and the running speed V to a predetermined relationship in the form of a running-speed-control CVT shifting map. The transmission-shifting control portion 94 calculates the running-speed-control target gear ratio γcvttgtv (=Npritgtv/Nsec) based on the calculated running-speed-control target primary rotational speed Npritgtv.

At block B15 shown in FIG. 10, the transmission-shifting control portion. 94 and the target-thrust calculating portion 95 calculate a running-speed-control target primary pressure Pintgtv and a running-speed-control target secondary pressure Pouttgtv. The transmission-shifting control portion. 94 supplies, to the hydraulic control unit 46, the hydraulic control command signal. Scvt requesting the primary pressure Pin and the secondary pressure Pout to be regulated to the calculated running-speed-control target primary pressure Pintgtv and the calculated running-speed-control target secondary pressure Pouttgtv, respectively. At this block B15, substantially the same control operations as operations in the CVT hydraulic control described above with reference to the block diagram of FIG. 5, are carried out.

At block B16 shown in FIG. 10, the engine control device 42 changes the engine torque Te in accordance with the engine-control command signal Se. Meanwhile, the hydraulic control unit 46 regulates the primary pressure Pin and the secondary pressure Pout in accordance with the hydraulic control command signal Scvt. The actual running speed V is thus controlled in the automatic running-speed control.

The state determining portion 98 determines whether the vehicle 10 is in the driving state or in the driven state, based on the drive-force related value used in the automatic running-speed control executed by the automatic running-speed control portion 96. In this determination, the belt-portion input torque Tb, which is one of the above-described examples of the drive-force related value, is used. The state determining portion 98 determines that the vehicle 10 is in the driven state when the belt-portion input torque Tb is smaller than a first determination threshold T1. The state determining portion 98 determines that the vehicle 10 is in the driving state when the belt-portion input torque Tb is not smaller than a second determination threshold T2. When the belt-portion input torque Tb is not smaller than the first determination threshold T1 and is smaller than the second determination threshold T2, the state determining portion 98 does not change determination as to whether the vehicle 10 is in the driving state or the driven state, namely, maintain result of the previous determination.

The first determination threshold T1 is a predetermined threshold value which is used to determine whether the vehicle 10 is in the driving state or in the driven state, and which is used to switch from a determination that the vehicle 10 is in the driving state to a determination that the vehicle 10 is in the driven state. The second determination threshold T2 is another predetermined threshold value which is larger than the first determination threshold T1 and which is used to switch from the determination that the vehicle 10 is in the driven state to the determination that the vehicle 10 is in the driving state. Thus, in the determination as to whether the vehicle 10 is in the driving state or in the driven state, a hysteresis is provided by a difference between the first determination threshold T1 and the second determination threshold T2, so as to restrain a hunting that could be caused by the switching between the determination that the vehicle 10 is in the driven state and the determination that the vehicle 10 is in the driving state. In the following description relating to the present embodiment, the difference between the first determination threshold T1 and the second determination threshold T2 is referred to as "hysteresis Thys". Thus, the second determination threshold T2 (=T1+Thys) corresponds to a sum of the first determination threshold T1 and the hysteresis Thys.

When the state determining portion 98 determines that the vehicle 10 is in the driving state, the transmission-shifting control portion 94 calculates the driving-state input torque Tdrv as the slip-limit-thrust calculation torque Tin. When the state determining portion 98 determines that the vehicle 10 is in the driven state, the transmission-shifting control portion 94 calculates the driven-state input torque Tdrvn as the slip-limit-thrust calculation torque Tin.

As the secondary target thrust Wouttgt, a larger one of the secondary-side slip limit thrust Woutlmt and the secondary-side shifting-control thrust Woutsh is selected. The secondary-side shifting-control thrust Woutsh is a value based on the secondary balance thrust Woutbl (=Winlmt*τin), and is the secondary thrust Wout that is calculated based on the primary-side slip limit thrust Winlmt. Therefore, the target-thrust calculating portion 95 calculates the secondary target thrust Wouttgt based on the primary thrust Win by using the thrust ratio τin. As shown in the thrust ratio map (τin) of FIG. 6, the thrust ratio τin is set to a predetermined value that is larger in the driven state than in the driving state. In other words, the thrust ratio tin is calculated such that a predetermined condition is satisfied, wherein the predetermined condition is that a value of the thrust ratio τin during the driven state of the vehicle 10 makes a difference between the primary thrust Win and the secondary target thrust Wouttgt larger, than a value of the calculated thrust ratio τin during the driving state of the vehicle 10 does. Thus, the target-thrust calculating portion 95 sets the secondary target thrust Wouttgt to a value that is larger when the vehicle 10 is in the driven state than when the vehicle 10 is in the driving state.

By the way, in the automatic running-speed control in which the engine torque Te is changed by feedback of the actual running speed V, a periodical change of the engine torque Te is likely to be caused in the vicinity of a boundary between the driving state and the driven state. Thus, in the CVT hydraulic control as shown in FIG. 5, fluctuation of the secondary target thrust Wouttgt due to switching between the driven state and the driving state is more likely to be caused. The fluctuation of the secondary target thrust Wouttgt causes fluctuation of the secondary pressure Pout, thereby changing a load of the oil pump 44 that generates an original pressure of the secondary pressure Pout, so that a load of the engine 12 driving the oil pump 44 is fluctuated whereby the belt-portion input torque Tb is also fluctuated. Further, due to the fluctuation of the belt-portion input torque Tb, an efficiency of transmission of the drive force could be changed in the continuously-variable transmission mechanism 24. Consequently, it becomes difficult to establish the running-speed-control target drive force Fwtgtv, by accurately recognizing a situation, so that controllability of the running speed V could be reduced.

In the present embodiment, during execution of the automatic running-speed control, the electronic control apparatus 90 increases the hysteresis Thys for the determination as to whether the vehicle 10 is in the driving state or in the driven state, so that the fluctuation of the secondary target thrust Wouttgt due to switching between the driven state and the driving state is less likely to be caused, whereby the controllability of the running speed V is improved.

For realizing control function to improve the controllability of the running speed V, the electronic control apparatus 90 further includes a threshold setting means or portion in the form of a threshold setting portion 99.

The state determining portion 98 determines whether the automatic running-speed control is being operated or not, namely, whether the automatic running-speed control is being executed or not. The state determining portion 98 determines that the automatic running-speed control is being executed, for example, when the target drive force Fwtgtv set by the automatic running-speed control, rather than the target drive force Fwtgt set by operation made by the vehicle operator, is being reflected in control of the vehicle 10, namely, when the vehicle 10 is being controlled in accordance with the target drive force Fwtgtv set by the automatic running-speed control, rather than the target drive force Fwtgt set by operation made by the vehicle operator. The state determining portion 98 determines that the automatic running-speed control is not being executed, for example, when the target drive force Fwtgt set by operation made by the vehicle operator is being reflected in control of the vehicle 10, namely, when the vehicle 10 is being controlled in accordance with the target drive force Fwtgt set by operation made by the vehicle operator.

In a case when the state determining portion 98 determines that the automatic running-speed control is being executed, the threshold setting portion 99 makes the hysteresis Thys (corresponding to the difference between the first determination threshold T1 and the second determination threshold T2) larger, such that a range of the belt-portion input torque Tb in which it is determined that the vehicle 10 is in the driven state is wider, as compared with a case when the state determining portion 98 determines that the automatic running-speed control is not being executed. Specifically, the threshold setting portion 99 sets a control-execution hysteresis Thys1 that is the hysteresis Thys during execution of the automatic running-speed control, to a value larger than a value of a control-non-execution hysteresis Thys2 that is the hysteresis Thys during non-execution of the automatic running-speed control. That is, the threshold setting portion 99 sets the second determination threshold T2 during execution of the automatic running-speed control, to a value (=T1+Thys1) higher than a value (=T1+Thys2) of the second determination threshold T2 during non-execution of the automatic running-speed control. Thus, the control-execution hysteresis Thys1 is set relative to the control-non-execution hysteresis Thys2 such that the range in which it is determined that the vehicle 10 is in the driven state is made wider when the automatic running-speed control is being executed than when the automatic running-speed control is not being executed, whereby the thrust ratio τin is more likely to be set to a large value and accordingly the secondary thrust Wout is less likely to made small during execution of the automatic running-speed control. Therefore, during execution of the automatic running-speed control, the fluctuation of the secondary thrust Wout due to switching between the driven state and the driving state is restrained to improve the controllability of the running speed V, and the belt torque capacity Tcvt is easily assured whereby a belt slippage is easily prevented or restrained. The fluctuation of the secondary thrust Wout is, for example, a hunting of the secondary thrust Wout.

Figure 11:
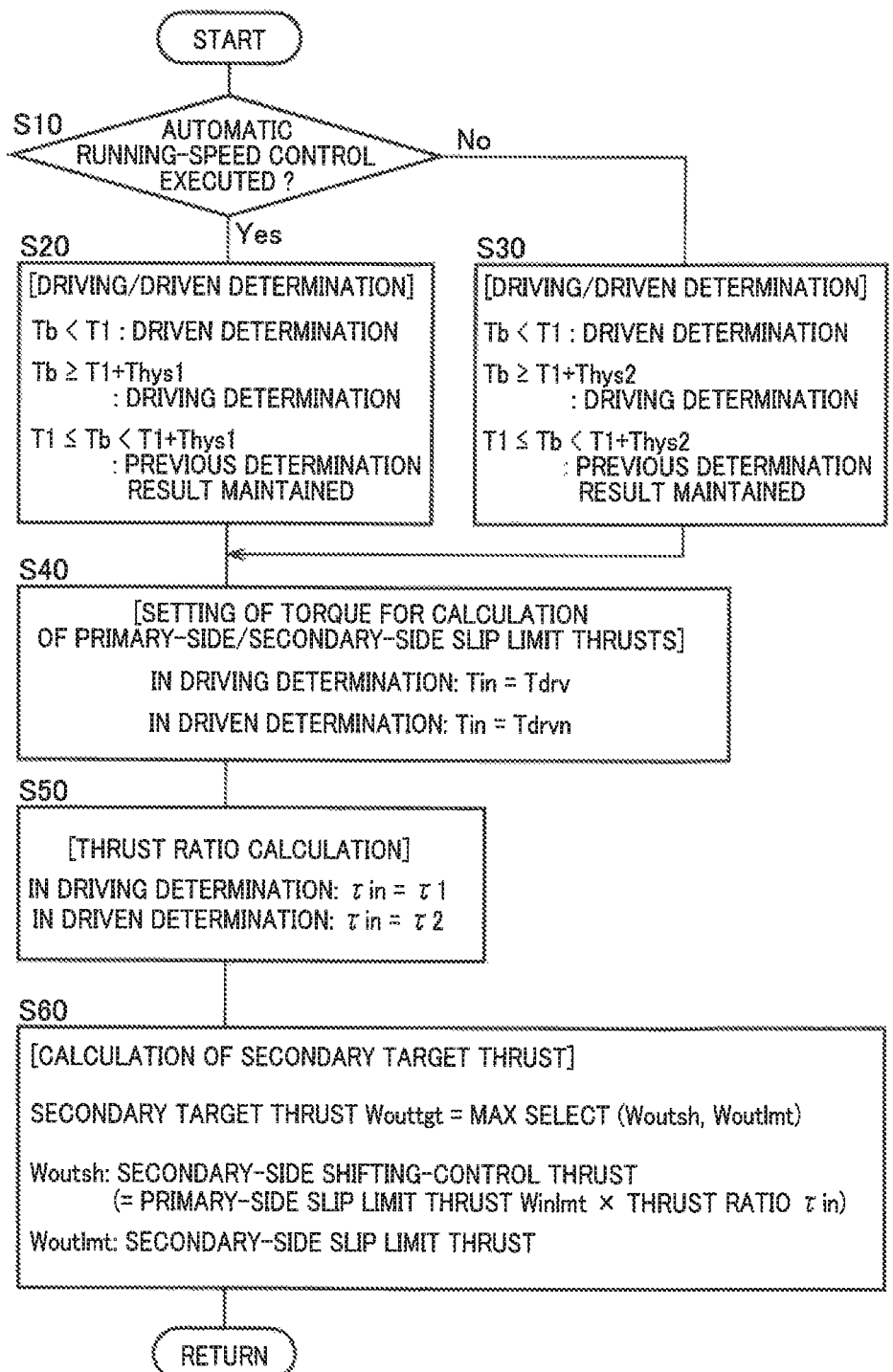
FIG. 11 is a flow chart showing a main part of a control routine executed by the control apparatus, namely, a control routine that is executed for improving controllability of a running speed of the vehicle while restraining or preventing a belt slippage during execution of the automatic running-speed control.

FIG. 11 is a flow chart showing a main part of a control routine executed by the electronic control apparatus 90, namely, a control routine that is executed for improving controllability of the running speed V while restraining or preventing a belt slippage during execution of the automatic running-speed control. This control routine is executed, for example, in a repeated manner during running of the vehicle 10. The flow chart of FIG. 11 is related to control operations corresponding to "SECONDARY TARGET THRUST CALCULATING PORTION" in the CVT hydraulic control described above with reference to the block diagram of FIG. 5.

As shown in FIG. 11, the control routine is initiated with step S10 corresponding to function of the state determining portion 98, which is implemented to determine whether the automatic running-speed control is being executed or not. When an affirmative determination is made at S10, step S20 corresponding to functions of the threshold setting portion 99 and the state determining portion 98 is implemented to determine whether the vehicle 10 is in the driving state or in the drive state, based on the belt-portion input torque Tb. The hysteresis Thys used in this determination is the control-execution hysteresis Thys1 (that is larger than the control-non-execution hysteresis Thys2), so that it is determined that the vehicle 10 is in the driven state when the belt-portion input torque Tb is smaller than the first determination threshold T1 (Tb<first determination threshold T1), and it is determined that the vehicle 10 is in the driving state when the belt-portion input torque Tb is not smaller than the second determination threshold T2 (Tb≥T2 (=T1+Thys1)). When the belt-portion input torque Tb is not smaller than the first determination threshold T1 and smaller than the second determination threshold T2 (T1≤Tb<T1+Thys1), result of the previous determination is maintained. On the other hand, when a negative determination is made at step S10, step S30 corresponding to functions of the threshold setting portion 99 and the state determining portion 98 is implemented to determine Whether the vehicle 10 is in the driving, state or the drive state, based on the belt-portion input torque Tb. The hysteresis Thys used in this determination is the control-non-execution hysteresis Thys2 (that is smaller than the control-execution hysteresis Thys1), so that it is determined that the vehicle 10 is in the driven state when the belt-portion input torque Tb is smaller than the first determination threshold T1 (Tb<first determination threshold T1), and it is determined that the vehicle 10 is in the driving state when the belt-portion input torque Tb is not smaller than the second determination threshold T2 (Tb≥T2 (=T1+Thys2)). When the belt-portion input torque Tb is not smaller than the first determination threshold T1 and smaller than the second determination threshold T2 (T1≤Tb<T1+Thys2), result of the previous determination is maintained. After implementation of step S20 or step S30, step S40 corresponding to function of the transmission-shifting control portion 94 is implemented to set the slip-limit-thrust calculation torque Tin. When it is determined that the vehicle 10 is in the driving state, the slip-limit-thrust calculation torque Tin is set to the driving-state input torque Tdrv at step S40. When it is determined that the vehicle 10 is in the driven state, the slip-limit-thrust calculation torque Tin is set to the driven-state input torque Tdrvn at step S40. Step S40 is followed by step S50 corresponding to function of the target-thrust calculating portion 95, which is implemented to calculate the thrust ratio τin, by using the thrust ratio map (τin) shown in FIG. 6. For example, as shown in FIG. 6, the thrust ratio tin is set to a thrust ratio τ1 when it is determined that the vehicle 10 is in the driving state, and is set to a thrust ratio τ2 when it is determined that the vehicle 10 is in the driven state, wherein the thrust ratio τ1 and the thrust ratio τ2 establish the same target gear ratio γcvttgt and the same absolute value |SFin$^{-1}$| of the reciprocal. SFin$^{-1}$ of the primary-side safety factor SFin (see FIG. 6). There is a certain value (>0) of the belt-portion input torque Tb, which could cause the determination that the vehicle 10 is in the driving state, without the above-described enlargement of the hysteresis Thys, but which causes the determination that the vehicle 10 is in the driven state owing to the above-described enlargement of the hysteresis Thys, so that the thrust ratio τin is set to the thrust ratio τ2 in the driven-state region, instead of being set to the thrust ratio τ1 in the driving-state region. Since the thrust ratio τ2 is higher than the thrust ratio τ1, the belt torque capacity Tcvt is more likely to be made sufficiently large, owing to the above-described enlargement of the hysteresis Thys which increases the range of the belt-portion input torque Tb in which it is determined that the vehicle 10 is in the driven state. Step S50 is followed by step S60 corresponding to function of the target-thrust calculating portion 95, which is implemented to select, as the secondary target thrust Wouttgt, a larger one of the secondary-side slip limit thrust Woutlmt and the secondary-side shifting-control thrust Woutsh.

As described above, in the present embodiment, the hysteresis Thys, which corresponds to the difference between the first determination threshold T1 and the second determination threshold T2, is made larger when the automatic running-speed control is being executed than when the automatic miming-speed control is not being executed, such that the range of the belt-portion input torque Tb as the drive-force related value in which it is determined that the vehicle 10 is in the driven state is wider when the automatic running-speed control is being executed than when the automatic running-speed control is not being executed. Thus, when the automatic running-speed control is being executed, fluctuation of the secondary thrust Wout due to switching between the determination of the driven state and the determination of the driving state is less likely to be caused when the automatic running-speed control is being executed, whereby controllability of the vehicle running speed is improved during execution of the automatic running-speed control. Further, since the hysteresis Thys is made larger during execution of the automatic running-speed control such that the above-described range of the belt-portion input torque Tb (in which it is determined that the vehicle 10 is in the driven state) is wider, it is more likely to be determined that the vehicle 10 is in the driven state in which the secondary target thrust Wouttgt is made larger than in the driving state, so that the belt slippage due to insufficiency of the secondary thrust Wout is less likely to be caused. Thus, during execution of the automatic running-speed control, it is possible to improve controllability of the running speed V of the vehicle 10 while restraining or preventing the belt slippage.

In the present embodiment, the drive-force related value, which is to be changed and which is used to control the actual running speed V, is the engine torque Te, the belt-portion input torque Tb or the drive torque Tw, so that the automatic running-speed control is appropriately executed.

In the present embodiment, the thrust ratio τ, which establishes the target gear ratio γcvttgt of the continuously-variable transmission mechanism 24, is calculated based on the belt-portion input torque Tb as the input torque inputted to the continuously-variable transmission mechanism 24, and the calculated thrust ratio Tin is used to calculate the secondary target thrust Wouttgt based on the primary thrust Win. Thus, it is possible to appropriately obtain the secondary thrust Wou which establishes the target gear ratio γcvttgt of the continuously-variable transmission mechanism 24 and which is dependent on the belt-portion input torque Tb. Further, the thrust ratio τin is calculated based on the belt-portion input torque Tb such that the predetermined condition is satisfied, wherein the predetermined condition is that a value of the thrust ratio τin during the driven state makes the difference between the primary thrust Win and the secondary target thrust Wouttgt larger, than a value of the thrust ratio τin during the driving state does. Therefore, the secondary target thrust Wouttgt is larger when the vehicle 10 is in the driven state than when the vehicle 10 is in the driving state.

In the present embodiment, the primary thrust Win, based on which the secondary target thrust Wouttgt is calculated, is the primary-side slip limit thrust Winlmt that is required to prevent a belt slippage on the primary pulley 60. Thus, it is possible to appropriately obtain the secondary thrust Wou that restrains or prevents the belt slippage.

In the present embodiment, a larger one of the secondary-side shifting-control thrust Woutsh and the secondary-side slip limit thrust Woutlmt is selected as the secondary target thrust Wouttgt, so that it is possible to appropriately obtain the secondary thrust Wou that establishes the target gear ratio γcvttgt of the continuously-variable transmission mechanism 24 while restraining or preventing the belt slippage.

In the present embodiment, the primary target thrust Wintgt is calculated based on the secondary target thrust Wouttgt. Thus, it is possible to appropriately obtain the secondary thrust Wou that establishes the target gear ratio γcvttgt of the continuously-variable transmission mechanism 24 while restraining or preventing the belt slippage. Further, each of the secondary thrust Wou and the primary thrust Win is not set to a value excessively large for prevention of the belt slippage.

While the preferred embodiment of this invention has been described in detail by reference to the drawings, it is to be understood that the invention may be otherwise embodied.

For example, in the above-described embodiment, the present invention is applied to the electronic control apparatus 90 for the drive-force transmitting apparatus 16 defining the plurality of drive-force transmitting paths that include the first and second drive-force transmitting paths PT1, PT2 provided in parallel with each other between the input shaft 22 and the output shaft 30, wherein the drive force is transmittable by the gear mechanism 28 through the first drive-force transmitting path PT1, and the drive force is transmittable by the continuously-variable transmission mechanism 24 through the second drive-force transmitting path PT2. However, for example, the present invention can be applied also to a control apparatus for a drive-force transmitting apparatus defining a single drive-force transmitting path provided between the drive force source and the drive wheels, wherein the drive force is transmittable by a belt-type continuously-variable transmission mechanism such as the continuously-variable transmission mechanism 24. That is, the present invention is applicable to a control apparatus for any drive-force transmitting apparatus, as long as the drive-force transmitting apparatus includes a continuously-variable transmission mechanism configured to transmit the drive force of the drive force source toward the drive wheels, and which includes the primary pulley, the secondary pulley and the transfer element that is looped over the primary and secondary pulleys.

In the above-described embodiment, the drive-force related value, which is changed in the automatic running-speed control and used to control the actual running speed V, is a manipulated variable such as the engine torque Te, the belt-portion input torque Tb, the driveshaft torque Tds, the drive torque Tw and the drive force Fw. However, the drive-force related value may be other manipulated variable such as, for example, the throttle opening degree tap that is changeable to control the running speed V in the automatic running-speed control.

In the above-described embodiment, during the automatic running-speed control executed by the automatic running-speed control portion 96, the engine torque Te is changed by feedback of the actual running speed V. However, for example, since the running speed V can be controlled also by controlling an acceleration of the vehicle 10, the manipulated variable such as the engine torque Te may be changed by feedback of an actual value of the acceleration as a controlled variable.

In the above-described embodiment, the belt-portion input torque Tb is used, by way of example, as the drive-force related value, based of which it is determined whether the vehicle 10 is in the driving state or in the driven state. However, for example, the drive-force related value may be the engine torque Te or the accelerator operation amount θacc that relates to the engine torque Te and the belt-portion input torque Tb.

In the above-described embodiment, the control routine shown in the flow chart of FIG. 11 may be modified as needed. For example, the control-execution hysteresis Thys1 and/or the second determination threshold. T2 (=T1+Thys1) may be set before implementation of step S20, and/or the control-non-execution hysteresis Thys2 and/or the second determination threshold T2 (T1+Thys2) may be set before implementation of step S30. It is noted that, where the hysteresis Thys or the second determination threshold T2 is set to a value dependent on result of the determination made at step S10, before implementations of steps S20 and S30, steps S20 and S30 may be integrated into a single step.

In the above-described embodiment, the second clutch C2 is disposed in a drive-force transmitting path between the secondary pulley 64 and the output shaft 30. However, this arrangement is not essential. It is possible to employ a modified arrangement in which, for example, the second clutch C2 is disposed in a drive-force transmitting path between the primary pulley 60 and the input shaft 22. In this modified arrangement, the secondary shaft 62 is connected integrally with the output shaft 30, and the primary shaft 58 is connected to the input shaft 22 through the second clutch C2.

In the above-described embodiment, the gear mechanism 28 is a gear mechanism which provides a single gear ratio that is higher than the highest gear ratio γmax of the continuously-variable transmission mechanism 24. However, the gear mechanism 28 may be, for example, a gear mechanism which provides a plurality of different gear ratios. That is, the gear mechanism 28 may be a gear mechanism in which a shifting action is to be executed from one of two or more gear positions to the other. Further, the gear mechanism 28 may be a gear mechanism that provides a gear ratio that is lower than the lowest gear ratio γmin of the continuously-variable transmission mechanism 24 and/or another gear ratio that is higher than the highest gear ratio γmax of the continuously-variable transmission mechanism 24.

In the above-described embodiment, the running mode of the drive-force transmitting apparatus 16 is switched between the gear running mode and the belt running mode, by using the shifting map in which the shift-up lines and shift-down lines are defined. However, the running mode of the drive-force transmitting apparatus 16 may be switched by setting a gear ratio satisfying the target drive force Fwtgt that is calculated based on the running speed V and the accelerator operation amount θacc.

In the above-described embodiment, the torque converter 20 is used as fluid-operated drive-force transmitting device. However, in place of the torque converter 20, any one of other types of fluid-operated drive-force transmitting devices such as a fluid coupling, which do not have a torque boosting function, may be used, for example. Further, the fluid-operated drive-force transmitting device does not have to be necessarily provided. In the above-described embodiment, the dog clutch D1 is provided in the first drive-force transmitting path PT1 through which the drive force is to be transmitted by the gear mechanism 28. However, the provision of the dog clutch D1 is not essential for carrying out the invention.

It is to be understood that the embodiment described above is given for illustrative purpose only, and that the present invention may be embodied with various modifications and improvements which may occur to those skilled in the art.

NOMENCLATURE OF ELEMENTS

10: vehicle
12: engine (drive force source)
14: drive wheels
16: vehicle drive-force transmitting apparatus
22: input shaft (input rotary member)
24: continuously-variable transmission mechanism
28: gear mechanism
30: output shaft (output rotary member)
60: primary pulley
60c: hydraulic actuator
64: secondary pulley
64c: hydraulic actuator
66: transmission belt (transfer element)
90: electronic control apparatus (control apparatus)
95: target-thrust calculating portion
96: automatic running-speed control portion
98: state determining portion
99: threshold setting portion
PT1: first drive-force transmitting path
PT2: second drive-force transmitting path

What is claimed is:

1. A control apparatus for a drive-force transmitting apparatus that is to be provided in a vehicle having a drive force source and drive wheels,
wherein the drive-force transmitting apparatus includes:
a continuously-variable transmission mechanism which is configured to transmit a drive force of the drive force source toward the drive wheels, and which includes a primary pulley, a secondary pulley and a transfer element that is looped over the primary and secondary pulleys, such that the primary pulley includes a primary hydraulic actuator configured to generate a primary thrust, based on which the transfer element is to be clamped by the primary pulley, and such that the secondary pulley includes a secondary hydraulic actuator configured to generate a secondary thrust, based on which the transfer element is to be clamped by the secondary pulley, and
wherein said control apparatus includes:
an automatic running-speed control portion configured to execute an automatic running-speed control to change a drive-force related value that is used to control a running speed of the vehicle such that an actual value of the running speed coincides with a target value of the running speed;
a state determining portion configured to make a determination as to whether the vehicle is in a driving state or a driven state, based on the drive-force related value;
a target-thrust calculating portion configured to calculate a target value of the secondary thrust based on the primary thrust, such that the calculated target value of the secondary thrust is larger when the vehicle is in the driven state than when the vehicle is in the driving state; and a threshold setting portion configured to set a first determination threshold of the drive-force related value which is used to determine whether the vehicle is in the driving state or in the driven state and a second determination threshold of the drive-force related value which is used to switch from a determination that the vehicle is in the driven state to a determination that the vehicle is in the driving state, such that a difference of the set first determination threshold and the set second determination threshold is larger when the automatic running-speed control is being executed than when the automatic running-speed control is not being executed, and a range of the drive-force related value in which it is determined that the vehicle is in the driven state is wider when the automatic running-speed control is being executed than when the automatic running-speed control is not being executed.

2. The control apparatus according to claim 1, wherein the drive-force related value is one of an output torque outputted from the drive force source, an input torque inputted to the continuously-variable transmission mechanism and a torque applied to the drive wheels.

3. The control apparatus according to claim 1,
wherein said target-thrust calculating portion is configured to calculate, based on an input torque inputted to the continuously-variable transmission mechanism, a thrust ratio which is a ratio of the secondary thrust of the secondary pulley to the primary thrust of the primary pulley and which establishes a target gear ratio of the continuously-variable transmission mechanism,
wherein said target-thrust calculating portion is configured to calculate the target value of the secondary thrust, based on the calculated thrust ratio and the primary thrust, and
wherein the thrust ratio is calculated based on the input torque by said target-thrust calculating portion such that a predetermined condition is satisfied, wherein the predetermined condition is that a value of the thrust ratio during the driven state of the vehicle makes a difference between the primary thrust and the target value of the secondary thrust larger, than a value of the thrust ratio during the driving state of the vehicle.

4. The control apparatus according to claim 1, wherein the primary thrust, based on which the target value of the secondary thrust is calculated, is a primary-side slip limit thrust that is required to prevent slippage of the transfer element on the primary pulley.

5. The control apparatus according to claim 4, wherein said target-thrust calculating portion is configured to select, as the target value of the secondary thrust, a larger one of the secondary thrust calculated based on the primary-side slip limit thrust and a secondary-side slip limit thrust that is required to prevent slippage of the transfer element on the secondary pulley.

6. The control apparatus according to claim 5, wherein said target-thrust calculating portion is configured to calculate, based on the target value of the secondary thrust, a target value of the primary thrust.

7. The control apparatus according to claim 1,
wherein the drive-force transmitting apparatus further includes: an input rotary member to which the drive force is to be transmitted from the drive force source; an output rotary member from which the drive force is to be outputted to the drive wheels; and a gear mechanism configured to provide at least one gear ratio,
wherein the drive-force transmitting apparatus defines a plurality of drive-force transmitting paths that are provided in parallel with each other between the input rotary member and the output rotary member, wherein the plurality of drive-force transmitting paths include a first drive-force transmitting path through which the drive force is to be transmitted by the gear mechanism from the input rotary member toward the output rotary member when the first drive-force transmitting path is established, and wherein the plurality of drive-force transmitting paths includes a second drive-force transmitting path through which the drive force is to be transmitted by the continuously-variable transmission mechanism from the input rotary member toward the output rotary member when the second drive-force transmitting path is established.

8. The control apparatus according to claim 1, wherein said state determining portion is configured to make the determination as to whether the vehicle is in the driving state or in the driven state, in a repeated manner during running of the vehicle, wherein said state determining portion is configured to determine that the vehicle is in the driven state when the drive-force related value is smaller than the first determination threshold, and to determine that the vehicle is in the driving state when the drive-force related value is not smaller than the second determination threshold that is larger than the first determination threshold, wherein said state determining portion is configured to maintain the determination previously made by said state determining portion when the drive-force related value is not smaller than the first determination threshold and smaller than the second determination threshold, and wherein said threshold setting portion is configured to set the first and second determination thresholds, such that said difference is larger when the automatic running-speed control is being executed than when the automatic running-speed control is not being executed, by at least making the second determination threshold larger when the automatic running-speed control is being executed than when the automatic running-speed control is net being executed.

* * * * *